US012579614B2

(12) United States Patent
Son et al.

(10) Patent No.: US 12,579,614 B2
(45) Date of Patent: Mar. 17, 2026

(54) IMAGING DEVICE

(71) Applicant: Samsung Electronics Co., Ltd.,
Suwon-si (KR)

(72) Inventors: Bongki Son, Suwon-si (KR);
Jeongyong Shin, Suwon-si (KR);
Seunghyun Lim, Suwon-si (KR)

(73) Assignee: SAMSUNG ELECTRONICS CO.,
LTD., Gyeonggi-Do (KR)

( * ) Notice: Subject to any disclaimer, the term of this
patent is extended or adjusted under 35
U.S.C. 154(b) by 552 days.

(21) Appl. No.: 17/978,489

(22) Filed: Nov. 1, 2022

(65) Prior Publication Data

US 2023/0146691 A1      May 11, 2023

(30) Foreign Application Priority Data

Nov. 11, 2021    (KR) .......................... 10-2021-0155151
Nov. 11, 2021    (KR) .......................... 10-2021-0155152
Mar. 8, 2022    (KR) .......................... 10-2022-0029468
Jul. 12, 2022    (KR) .......................... 10-2022-0085879

(51) Int. Cl.
*G06T 5/50*          (2006.01)
*G06T 3/4038*          (2024.01)
*G06T 3/60*          (2024.01)

(52) U.S. Cl.
CPC .............. *G06T 5/50* (2013.01); *G06T 3/4038*
(2013.01); *G06T 3/60* (2013.01); *G06T*
*2207/20221* (2013.01)

(58) Field of Classification Search
CPC ........... G06T 5/50; G06T 3/4038; G06T 3/60;
G06T 2207/20221
See application file for complete search history.

(56) References Cited

U.S. PATENT DOCUMENTS

| | | | | |
|---|---|---|---|---|
| 5,657,402 | A * | 8/1997 | Bender ................. | G06T 3/4038 |
| | | | | 382/284 |
| 5,991,444 | A * | 11/1999 | Burt ...................... | G06T 3/4038 |
| | | | | 375/E7.263 |
| 6,215,914 | B1 * | 4/2001 | Nakamura ........... | H04N 1/3876 |
| | | | | 382/167 |
| 7,327,899 | B2 | 2/2008 | Liu et al. | |
| 8,554,014 | B2 | 10/2013 | Levy et al. | |
| 8,588,546 | B2 | 11/2013 | Habuka et al. | |

(Continued)

FOREIGN PATENT DOCUMENTS

| | | | | |
|---|---|---|---|---|
| JP | 2002315980 | A * | 10/2002 | |
| JP | 4001233 | B2 | 10/2007 | |

(Continued)

*Primary Examiner* — Stephen R Koziol
*Assistant Examiner* — Joshua Chen
(74) *Attorney, Agent, or Firm* — HARNESS, DICKEY &
PIERCE, P.L.C.

(57) ABSTRACT

An imaging device includes an image sensor configured to
generate a plurality of original images, and an image pro-
cessor configured to generate a merged image based on the
plurality of original images. The image processor is config-
ured to generate the merged image by classifying the plu-
rality of original images into a plurality of stitching groups
based on a first stitching direction, stitching original images
included in a same stitching group to generate a plurality of
intermediate images, and stitching the plurality of interme-
diate images based on a second stitching direction to gen-
erate the merged image.

17 Claims, 24 Drawing Sheets

(56) References Cited

U.S. PATENT DOCUMENTS

| | | | |
|---|---|---|---|
| 8,744,213 B2 | 6/2014 | Tatke et al. | |
| 9,088,714 B2 * | 7/2015 | Doepke | H04N 23/698 |
| 9,390,324 B1 | 7/2016 | Ariga et al. | |
| 9,641,754 B2 * | 5/2017 | Oh | H04N 23/695 |
| 9,652,856 B2 * | 5/2017 | Takenaka | G06T 3/047 |
| 10,013,763 B1 | 7/2018 | Brailovskiy et al. | |
| 10,068,334 B2 | 9/2018 | Wang et al. | |
| 10,257,494 B2 | 4/2019 | Sadi et al. | |
| 10,313,656 B2 * | 6/2019 | Sadi | G03B 37/04 |
| 10,585,344 B1 | 3/2020 | Lablans | |
| 10,728,474 B2 | 7/2020 | Douady et al. | |
| 10,991,073 B2 | 4/2021 | Cho et al. | |
| 11,064,110 B2 | 7/2021 | Douady-Pleven et al. | |
| 11,455,709 B2 * | 9/2022 | Wang | G06T 5/50 |
| 2011/0141225 A1 * | 6/2011 | Stec | G06T 1/00 |
| | | | 348/E7.001 |
| 2018/0025478 A1 | 1/2018 | Lee et al. | |
| 2019/0058811 A1 * | 2/2019 | Douady-Pleven | H04N 23/698 |
| 2020/0186710 A1 | 6/2020 | Sheikh et al. | |
| 2021/0287384 A1 | 9/2021 | Son et al. | |
| 2022/0414825 A1 * | 12/2022 | Hsu | G06T 7/337 |

FOREIGN PATENT DOCUMENTS

| | | | |
|---|---|---|---|
| KR | 101885778 B1 | 8/2018 | |
| KR | 102075454 B1 | 2/2020 | |

* cited by examiner

FIG. 5B

IMAGING DEVICE

CROSS-REFERENCE TO RELATED APPLICATIONS

This application claims priority under 35 U.S.C. § 119 to Korean Patent Application Nos. 10-2021-0155151, filed on Nov. 11, 2021, 10-2021-0155152, filed on Nov. 11, 2021, 10-2022-0029468, filed on Mar. 8, 2022, and 10-2022-0085879, filed on Jul. 12, 2022, in the Korean Intellectual Property Office, the disclosures of which are incorporated by reference herein in their entireties.

FIELD

The inventive concept relates to an imaging device, and more particularly, to an imaging device which stitches a plurality of original images.

BACKGROUND

Electronic devices may provide a camera function of photographing an external object to generate or store an image or a video. In this case, in order to obtain an image having a wide angle of view or an image having high resolution, electronic devices may stitch a plurality of images generated by an image sensor.

In this case, the plurality of images may be arranged in both directions (for example, a horizontal direction and a vertical direction) instead of one direction (for example, the horizontal direction). Therefore, it is desired or required to develop a method of stitching images arranged in various directions.

Also, because the number of arithmetic operations and much processing time are needed in stitching a plurality of images to generate one image, it is desired or required to develop a method of decreasing the number of arithmetic operations and the processing time.

SUMMARY

The inventive concepts provide an imaging device, which may stitch images arranged in various directions.

Moreover, the inventive concepts provide an imaging device, which may stitch images through a small number of arithmetic operations in a short processing time.

According to an aspect of the inventive concepts, an imaging device includes an image sensor configured to generate a plurality of original images, and an image processor configured to generate a merged image based on the plurality of original images. The image processor is configured to generate the merged image by classifying the plurality of original images into a plurality of stitching groups based on a first stitching direction, stitching original images included in a same stitching group to generate a plurality of intermediate images, and stitching the plurality of intermediate images based on a second stitching direction to generate the merged image.

According to another aspect of the inventive concepts, an imaging device for generating a merged image based on a plurality of original images includes a memory configured to store a conversion matrix for warping an original image, and a cropping region of the original image, an image sensor configured to generate the original image, warp the original image by using the conversion matrix to generate a warping image, and crop the warping image by using the cropping region to generate a cropping image, and an image processor configured to receive a plurality of cropping images from the image sensor, and blend the plurality of cropping images to generate a merged image.

According to another aspect of the inventive concepts, an imaging device includes a memory configured to store a conversion matrix for warping an original image, and a cropping region of the original image, an optical device configured to rotate based on rotation information, the rotation information including a direction and an angle, and a controller configured to transmit a rotation signal to the optical device, and generate a photograph signal corresponding to the rotation signal. The device includes an image sensor configured to, in response to the photograph signal received from the controller, photograph a target object to generate an original image, warp the original image by using the conversion matrix to generate a warping image, and crop the warping image by using the cropping region to generate a cropping image, and an application processor configured to receive a plurality of cropping images from the image sensor, and blend the plurality of cropping images to generate a merged image.

BRIEF DESCRIPTION OF THE DRAWINGS

Some example embodiments will be more clearly understood from the following detailed description taken in conjunction with the accompanying drawings in which:

FIGS. 5A, 5B, 5C and 5D are diagrams illustrating a process of generating a merged image from a plurality of original images by using an imaging device, according to an example embodiment;

DETAILED DESCRIPTION

Hereinafter, some example embodiments will be described in detail with reference to the accompanying drawings.

Figure 1:
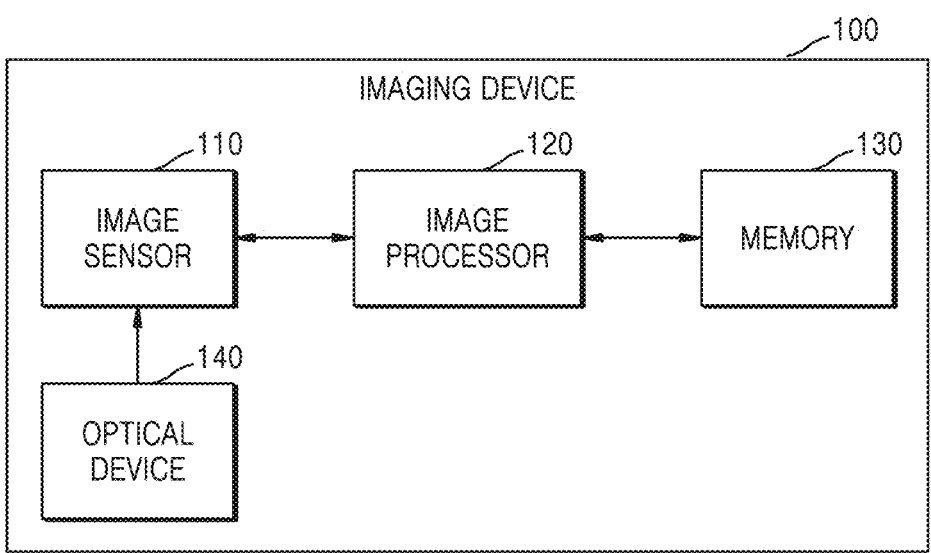
FIG. 1 is a block diagram illustrating an imaging device according to an example embodiment.

FIG. 1 is a block diagram illustrating an imaging device 100 according to an example embodiment.

Referring to FIG. 1, the imaging device 100 according to an example embodiment may include an image sensor 110, an image processor 120, a memory 130, and an optical device 140.

The imaging device 100 may capture and/or store an image of an object by using a solid-state image sensor, such as a charge coupling device and a complementary metal oxide semiconductor (CMOS) image sensor, and may be implemented as a portion of a digital camera, a digital camcorder, a mobile phone, a tablet computer, or a portable electronic device, but example embodiments are not limited thereto. The portable electronic device may include a laptop computer, a portable phone, a smartphone, a tablet personal computer (PC), a personal digital assistant (PDA), an enterprise digital assistant (EDA), a digital still camera, a digital video camera, an audio device, a portable multimedia player (PMP), a personal navigation device (PND), an MP3 player, a handheld game console, an e-book, and a wearable device, but example embodiment are not limited thereto. Also, the imaging device 100 may be equipped in electronic devices, such as drones and advanced driver assistance systems (ADASs), or an electronic device provided as an element in vehicles, furniture, manufacturing equipment, doors, and various kinds of measurement devices.

The image sensor 110 may generate a plurality of original images. The plurality of original images may be images having different fields of view with respect to one scene and may photograph a target object with different fields of view by using the optical device 140 capable of rotating in a desired (or alternatively, predetermined) direction and at a desired (or alternatively, predetermined) angle to generate a plurality of original images. The image sensor 110 may output the generated plurality of original images to the image processor 120. The image sensor 110 may output, to the image processor 120, a plurality of indexes respectively corresponding to the plurality of original images. An index may represent spatial coordinates of an original image. The image sensor 110 may be equipped in an electronic device having an image or light sensing function.

The image processor 120 may receive the plurality of original images from the image sensor 110. Also, the image processor 120 may perform image processing on the plurality of original images.

In an example embodiment, the image processor 120 may perform an operation of generating a merged image based on the plurality of original images. The image processor 120 may classify the plurality of original images into a plurality of stitching groups based on a first stitching direction, stitch original images included in the same stitching group to generate a plurality of intermediate images, and stitch the plurality of intermediate images based on a second stitching direction to generate the merged image.

In some example embodiments, the image processor 120 may blend original images included in the same stitching group based on a conversion matrix calculated in an overlap region between the original images included in the same stitching group and a seam detected in the overlap region to stitch the original images included in the same stitching group. Also, the image processor 120 may blend the plurality of intermediate images based on a conversion matrix calculated in an overlap region between the plurality of intermediate images and a seam detected in the overlap region to stitch the plurality of intermediate images.

In FIG. 1, an example embodiment is illustrated where the image processor 120 is provided independently from the image sensor 110 in the image device 100, but example embodiments are not limited thereto and a portion of the image processor 120 may be disposed in the image sensor 110 or may be disposed in a separate processor outside the imaging device 100.

The memory 130 may store data needed for image processing. The memory 130 may be implemented as a volatile memory or a non-volatile memory. The volatile memory may include dynamic random access memory (RAM) (DRAM) and static RAM (SRAM), and the non-volatile memory may include read only memory (ROM), programmable ROM (PROM), electrically programmable ROM (EPROM), electrically erasable and programmable ROM (EEPROM), flash memory, phase-change RAM (PRAM), magnetic RAM (MRAM), resistive RAM (RRAM), and ferroelectric RAM (FRAM), but example embodiments are not limited thereto. In an embodiment, the memory 130 may be a one time programmable (OTP) memory included in the imaging device 100.

In an embodiment, the memory 130 may store a conversion matrix, which is used in a case where the image processor 120 stitches the plurality of original images to generate the merged image. Also, the memory 130 may be optimized through a cropping operation of the image processor 120.

The optical device 140 may rotate based on rotation information including a direction and an angle to adjust a field of view of each of the plurality of original images. For example, the optical device 140 may rotate in at least one of an x-axis direction, a y-axis direction, and a z-axis direction to allow the image sensor 110 to generate the plurality of original images having different fields of view with respect to one scene. In an example embodiment, the optical device 140 may move in up, down, left, and right directions through a rotation performed in pitch, yaw, and roll directions, and thus, may obtain different scenes. The optical device 140 may rotate at a desired (or alternatively, predetermined) angle in a desired (or alternatively, predetermined) direction based on an instruction received from the image processor 120.

The optical device 140 may be an optical collection device including a mirror or a lens. A more detailed structure of the optical device 140 is described below with reference to FIG. 2.

As described above, the imaging device 100 according to an example embodiment may stitch the plurality of original images based on the first and second stitching directions to generate a merged image, and thus, may stitch images arranged in various directions. Also, because a plurality of original images are stitched based on a conversion matrix calculated in an overlap region and a seam detected in the overlap region, a merged image may be generated through a small number of arithmetic operations in a short processing time.

Figure 2:
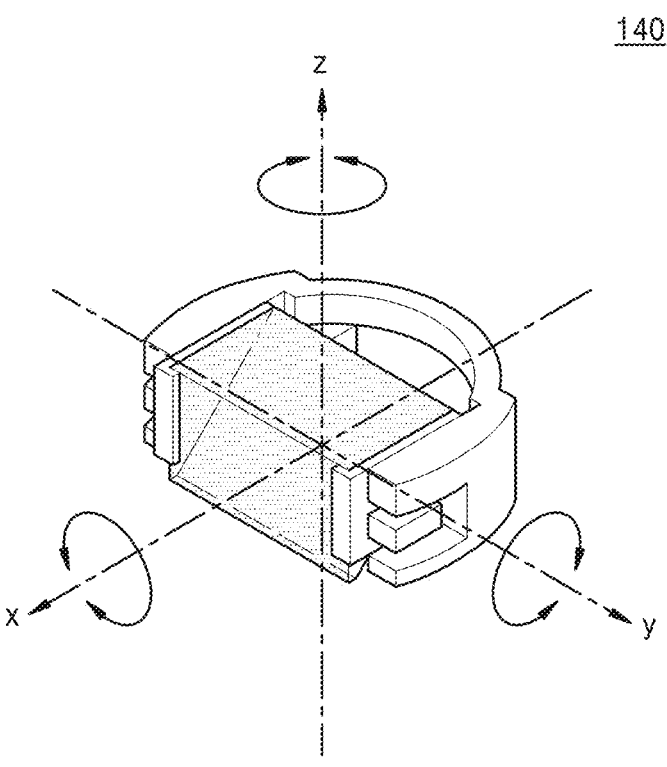
FIG. 2 is a diagram illustrating an optical device included in an imaging device according to an example embodiment.

FIG. 2 is a diagram illustrating an optical device 140 included in an imaging device according to an example embodiment.

Referring to FIG. 2, the shape of a prism lens according to an example embodiment of the optical device 140 may be checked. In FIG. 2, the prism lens according to an example embodiment of the optical device 140 is illustrated, but the inventive concepts are not limited thereto. In other example embodiments, an optical device for collecting light through various paths of light reflected by an object or changing a movement path of light by using an optical characteristic of dispersion or refraction of light may be used.

The optical device 140 may include a total of three spatial rotation shafts (for example, x-axis, y-axis, and z-axis spatial rotation shafts). The optical device 140 may rotate about at least one of an x-axis shaft, a y-axis shaft, and a z-axis shaft, and thus, may allow the image sensor 110 to generate a plurality of original images having different fields of view with respect to one scene.

An x-axis center rotation of the optical device 140 may be referred to as rolling (e.g., horizontal shaking). A y-axis center rotation of the optical device 140 may be referred to as pitching (e.g., vertical shaking). A z-axis center rotation of the optical device 140 may be referred to as yawing.

In an example embodiment, a pitch-direction rotation may be understood as a y-axis-direction rotation, which passes through the optical device 140 in a lateral direction, a yaw-direction rotation may be understood as a z-axis-direction rotation, which vertically passes through the optical device 140, and a roll-direction rotation may be understood as an x-axis-direction rotation, which passes through the optical device 140 in a longitudinal direction.

The image sensor 110 may have a threshold angle of view for imaging an object. A threshold angle of view may be limited by a setting of a user, or may be limited by a physical limitation of the image sensor 110. For example, in a case where the image sensor 110 is embedded in the imaging device 100, a threshold angle of view of the image sensor 110 may not be greater than 180 degrees.

In an example embodiment, the optical device 140 may allow the image sensor 110 to generate an original image representing a front subject, based on pitching and yawing. The optical device 140 may allow the image sensor 110 to generate an original image representing left and right of the subject, based on yawing. Also, the optical device 140 may allow the image sensor 110 to generate an original image representing up and down of the subject, based on pitching. That is, the optical device 140 may allow the image sensor 110 to generate an original image representing upper, lower, left, and right peripheral portions of the subject, based on pitching and yawing.

Figure 3:
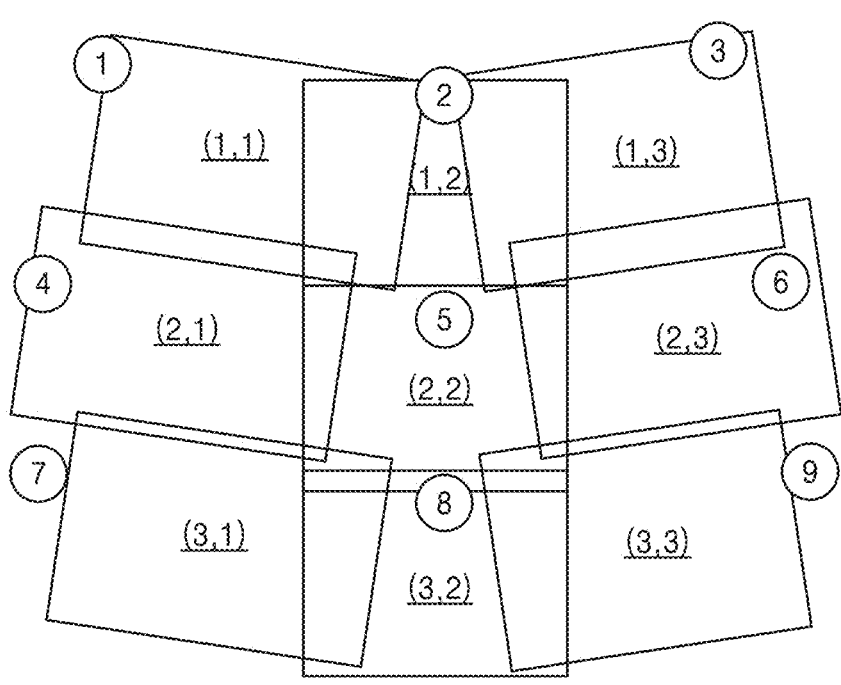
FIG. 3 is a diagram illustrating a plurality of original images generated by an imaging device according to an example embodiment.

FIG. 3 is a diagram illustrating a plurality of original images generated by an imaging device according to an example embodiment.

Referring to FIG. 3, a plurality of original images generated by an image sensor 110 may be checked. In the example embodiment of FIG. 3, the plurality of original images may include a total of nine original images, and for example, may include first to ninth original images.

Here, the number of original images generated by the image sensor 110 may be set based on a photograph mode received from the image processor 120. For example, when the photograph mode received from the image processor 120 is a first photograph mode for generating a total of nine original images, which include three original images in width and three original images in height, the image sensor 110 may generate the first to ninth original images as illustrated in FIG. 3. In some example embodiments, as in FIG. 3, the image processor 120 may arrange a plurality of original images based on a plurality of indexes, which are received from the image sensor 110 along with the plurality of original images.

For example, when the photograph mode received from the image processor 120 is a second photograph mode for generating a total of twenty original images, which include five original images in width and four original images in height, the image sensor 110 may generate first to twentieth original images unlike FIG. 3.

Hereinafter, an example embodiment where the imaging device 100 operates in the first photograph mode is mainly described.

The image sensor 110 may output, to the image processor 120, a plurality of indexes respectively corresponding to the plurality of original images along with the plurality of original images. The plurality of indexes may respectively represent spatial coordinates of the plurality of original images, and the plurality of indexes may be as illustrated by a circled digit in FIG. 3.

In the example embodiment of FIG. 3, a first original image may be an original image disposed at the left upper end among the plurality of original images, an index may be 1, and spatial coordinates may be (1, 1). A second original image may be an original image disposed at the center upper end among the plurality of original images, an index may be 2, and spatial coordinates may be (1, 2). A third original image may be an original image disposed at the right upper end among the plurality of original images, an index may be 3, and spatial coordinates may be (1, 3). A fourth original image may be an original image disposed at the left middle end among the plurality of original images, an index may be 4, and spatial coordinates may be (2, 1). A fifth original image may be an original image disposed at the center middle end among the plurality of original images, an index may be 5, and spatial coordinates may be (2, 2). A sixth original image may be an original image disposed at the right middle end among the plurality of original images, an index may be 6, and spatial coordinates may be (2, 3). A seventh original image may be an original image disposed at the left lower end among the plurality of original images, an index may be 7, and spatial coordinates may be (3, 1). An eighth original image may be an original image disposed at the center lower end among the plurality of original images, an index may be 8, and spatial coordinates may be (3, 2). A ninth original image may be an original image disposed at the right lower end among the plurality of original images, an index may be 9, and spatial coordinates may be (3, 3).

The optical device 140 may rotate at a desired (or alternatively, predetermined) angle in a desired (or alternatively, predetermined) direction based on an instruction received from the image processor 120. Therefore, a plurality of original images generated by the image sensor 110 in the same photograph mode may include common statistical characteristic information. For example, a first original image captured and generated in the first photograph mode may be an image which has rotated by the same angle as a second original image captured and generated in the first photograph mode. For example, the first original image captured and generated in the first photograph mode may be an image which is enlarged or reduced by the same magnification as the second original image captured and generated in the first photograph mode.

Figure 4:
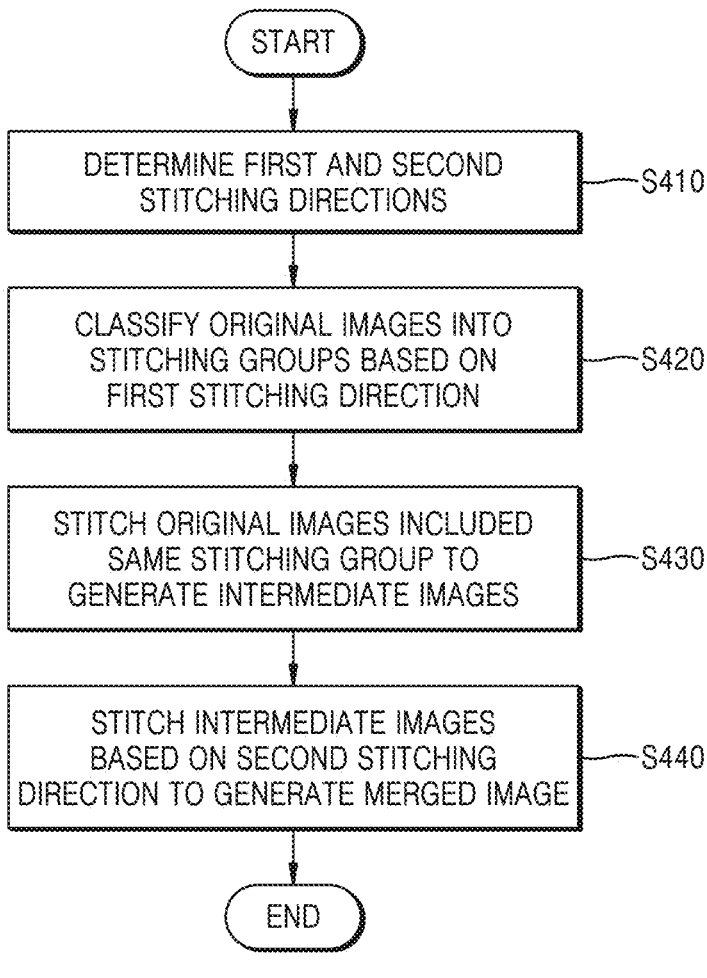
FIG. 4 is a flowchart illustrating a method of generating a merged image by using an imaging device, according to an example embodiment.

FIG. 4 is a flowchart illustrating a method of generating a merged image by using an imaging device, according to an example embodiment.

Referring to FIG. 4, in operation S410, the image processor 120 may determine first and second stitching directions.

A stitching direction may be a direction representing an order in which the image processor 120 stitches original images, in generating a merged image based on a plurality of original images.

In an example embodiment, the first and second stitching directions may be a row direction or a column direction. In this case, when the first stitching direction is the row direction, the second stitching direction may be the column direction. On the other hand, when the first stitching direction is the column direction, the second stitching direction may be the row direction.

For example, as illustrated in FIG. 3, when a plurality of original images include first to ninth original images and the first stitching direction is the row direction, the image processor 120 may first stitch original images arranged in the same row.

In an example embodiment, the image processor 120 may determine the first and second stitching directions based on rotation information about the optical device 140. In this case, the image processor 120 may set the first stitching direction to be equal to an initial rotation direction about the optical device 140. For example, when the optical device 140 rotates in the row direction first, the image processor 120 may set the first stitching direction to the row direction. Therefore, the image processor 120 may perform stitching in an order in which a plurality of original images are generated by the image sensor 110, and thus, a time interval between an initial original image generating time of the imaging device 100 and an image generating time may be reduced or minimized.

In operation S420, the image processor 120 may classify a plurality of original images into a plurality of stitching groups, based on the first stitching direction.

When the first stitching direction is the row direction, the image processor 120 may classify original images, arranged in the same row, into the same stitching group. On the other hand, when the first stitching direction is the column direction, the image processor 120 may classify original images, arranged in the same column, into the same stitching group.

In an example embodiment, as illustrated in FIG. 3, when a plurality of original images include first to ninth original images and the first stitching direction is the row direction, the image processor 120 may classify the first to third original images into the first stitching group, classify the fourth to sixth original images into the second stitching group, and classify the seventh to ninth original images into the third stitching group.

In another example embodiment, as illustrated in FIG. 3, when a plurality of original images include first to ninth original images and the first stitching direction is the column direction, the image processor 120 may classify the first, fourth, and seventh original images into the first stitching group, classify the second, fifth, and eighth original images into the second stitching group, and classify the third, sixth, and ninth original images into the third stitching group.

In operation S430, the image processor 120 may stitch original images included in the same stitching group to generate a plurality of intermediate images.

In an example embodiment, as illustrated in FIG. 3, when a plurality of original images include first to ninth original images and the first stitching direction is the row direction, the image processor 120 may stitch the first to third original images included in the first stitching group to generate a first intermediate image, stitch the fourth to sixth original images included in the second stitching group to generate a second intermediate image, and stitch the seventh to ninth original images included in the third stitching group to generate a third intermediate image.

In another example embodiment, as illustrated in FIG. 3, when a plurality of original images include first to ninth original images and the first stitching direction is the column direction, the image processor 120 may stitch the first, fourth, and seventh original images included in the first stitching group to generate a first intermediate image, stitch the second, fifth, and eighth original images included in the second stitching group to generate a second intermediate image, and stitch the third, sixth, and ninth original images included in the third stitching group to generate a third intermediate image.

In operation S440, the image processor 120 may stitch the plurality of intermediate images based on the second stitching direction to generate a merged image.

In an example embodiment, as illustrated in FIG. 3, when a plurality of original images include first to ninth original images and the second stitching direction is the column direction, the image processor 120 may stitch first to third intermediate images, on which stitching is completed in the row direction, to generate a merged image.

In another example embodiment, as illustrated in FIG. 3, when a plurality of original images include first to ninth original images and the second stitching direction is the row direction, the image processor 120 may stitch first to third intermediate images, on which stitching is completed in the column direction, to generate a merged image.

FIGS. 5A to 5D are diagrams illustrating a process of generating a merged image from a plurality of original images by using an imaging device, according to an example embodiment.

In FIGS. 5A to 5D, for convenience of illustration, it is illustrated that there is no overlap region between a plurality of original images and the plurality of original images have the same angle and the same magnification, but the inventive concepts are not limited thereto. In other example embodiments, there may be an overlap region between a plurality of original images, and the plurality of original images may have different angles and different magnifications.

Referring to FIGS. 5A to 5D, a process of stitching a plurality of original images to generate a merged image by using the image processor 120 may be determined. FIGS. 5A to 5D illustrate an example embodiment where a first stitching direction is a column direction and a second stitching direction is a row direction. In some example embodiments, because the first stitching direction is the column direction, the image processor 120 may classify first, fourth, and seventh original images I1, I4, and I7 into a first stitching group, classify second, fifth, and eighth original images I2, I5, and I8 into a second stitching group, and classify third, sixth, and ninth original images I3, I6, and I9 into a third stitching group.

Figure 5A:
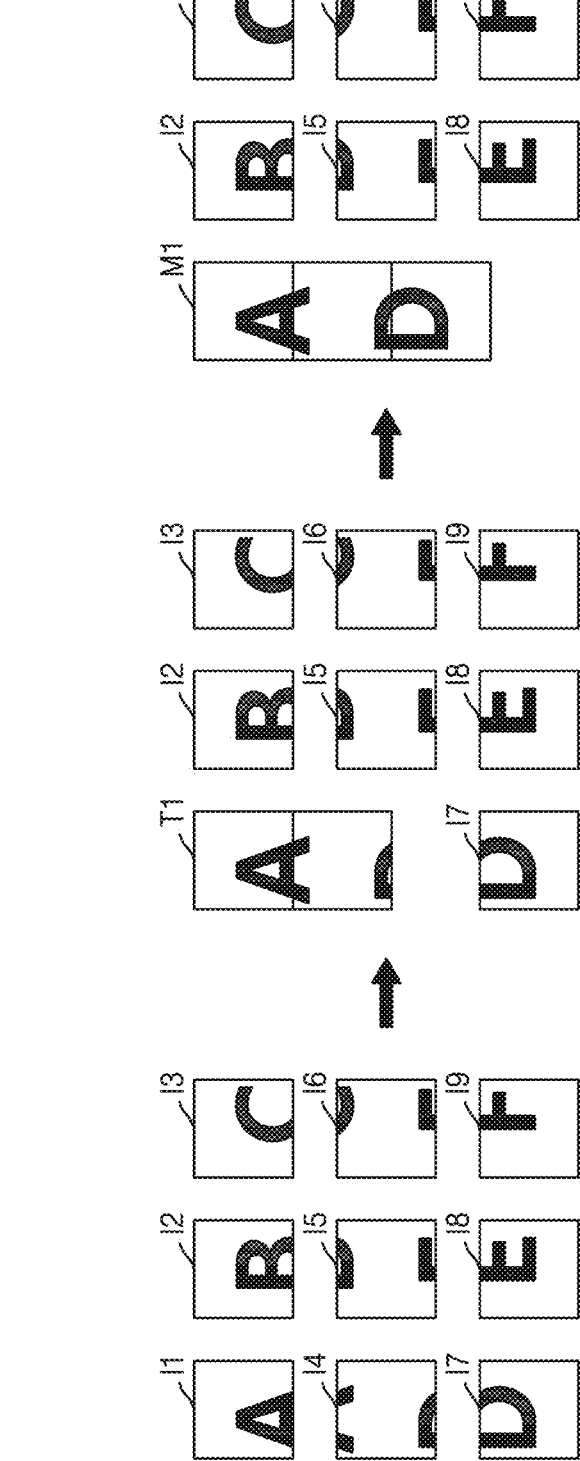

First, referring to FIG. 5A, a process of stitching the first, fourth, and seventh original images I1, I4, and I7 included in the first stitching group by using the image processor 120 may be checked.

As illustrated in the left region of FIG. 5A, when there are the first to ninth original images I1 to I9, the image processor

120 may stitch the first original image I1 and the fourth original image I4. As illustrated in the middle region of FIG. 5A generated in this manner, the image processor 120 may stitch an image T1, where the first original image I1 and the fourth original image I4 are stitched, and the seventh original image I7 to generate a first intermediate image M1. Therefore, a state which is as illustrated in the right region of FIG. 5A may be implemented.

Subsequently, referring to FIG. 5B, a process of stitching the second, fifth, and eighth original images I2, I5, and I8 by using the image processor 120 may be checked.

Figure 5B:
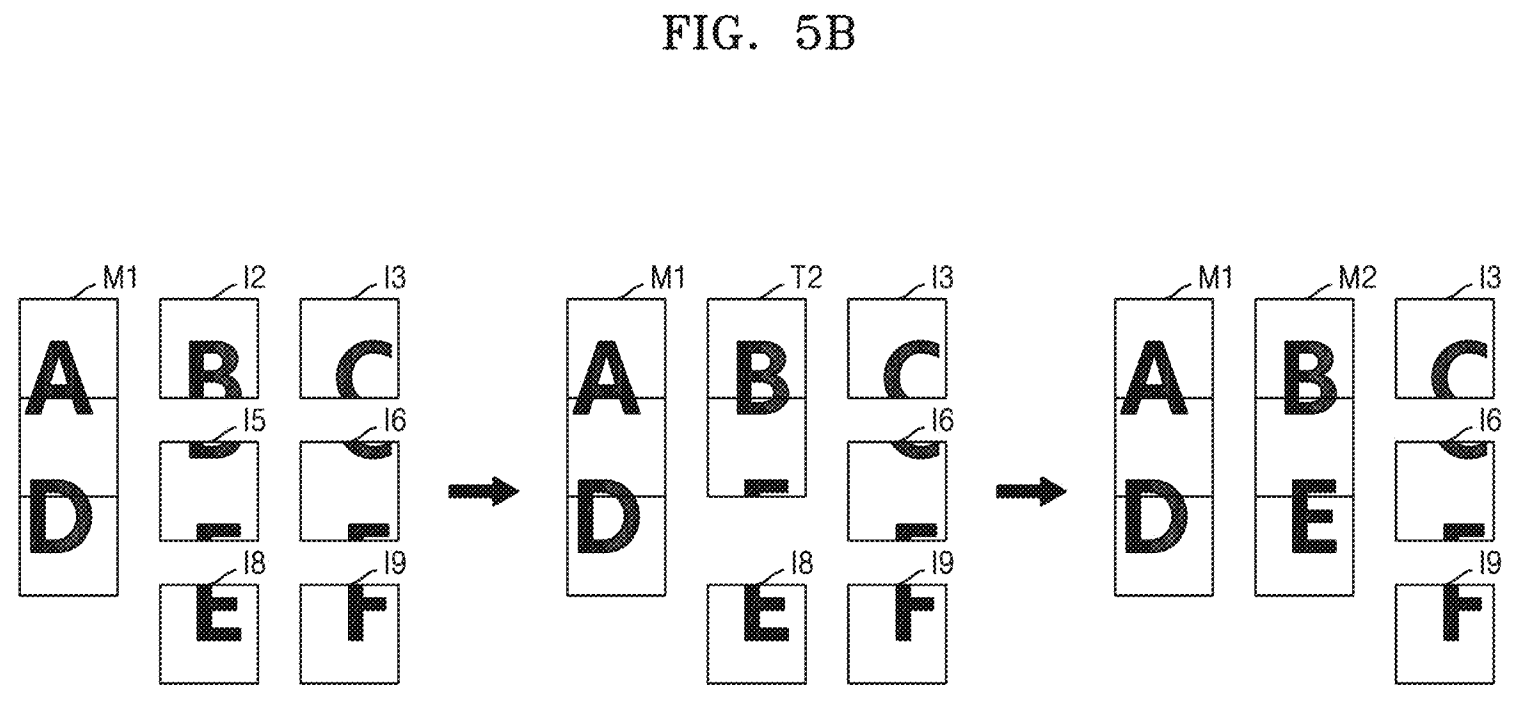

As illustrated in the left region of FIG. 5B, when there are the first intermediate image M1 and the second, third, fifth, sixth, eighth, and ninth original images I2, I3, I5, I6, I8, and I9, the image processor 120 may stitch the second original image I2 and the fifth original image I5. As illustrated in the middle region of FIG. 5B generated in this manner, the image processor 120 may stitch an image T2, where the second original image I2 and the fifth original image I5 are stitched, and the eighth original image I8 to generate a second intermediate image M2. Therefore, a state which is as illustrated in the right region of FIG. 5B may be implemented.

Subsequently, referring to FIG. 5C, a process of stitching the third, sixth, and ninth original images I3, I6, and I9 by using the image processor 120 may be checked.

Figure 5C:
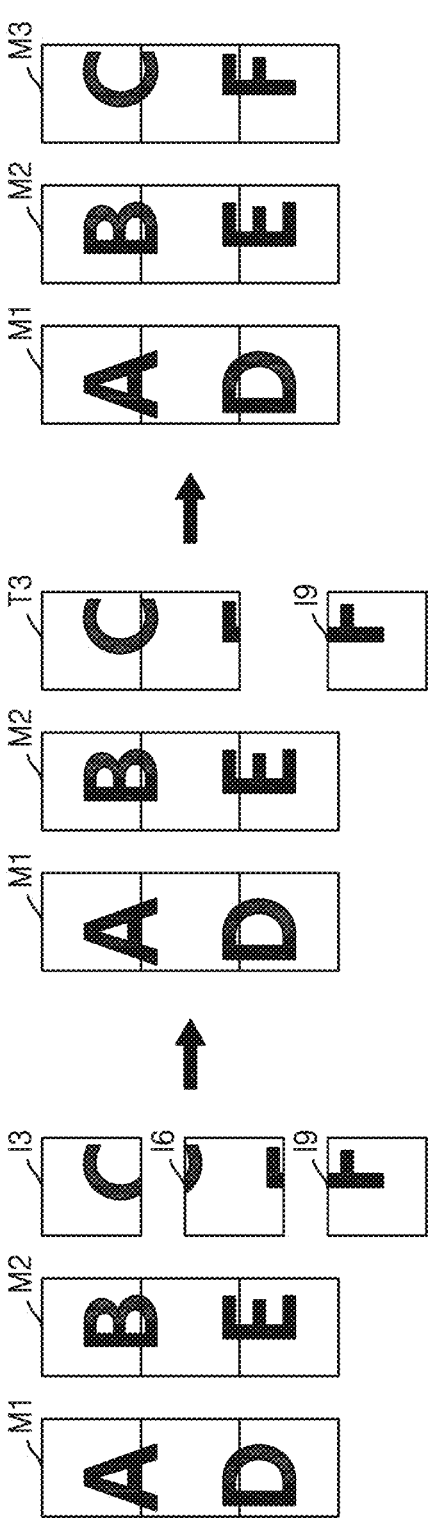

As illustrated in the left region of FIG. 5C, when there are the first and second intermediate images M1 and M2 and the third, sixth, and ninth original images I3, I6, and I9, the image processor 120 may stitch the third original image I3 and the sixth original image I6. As illustrated in the middle region of FIG. 5C generated in this manner, the image processor 120 may stitch an image T3, where the third original image I3 and the sixth original image I6 are stitched, and the ninth original image I9 to generate a third intermediate image M3. Therefore, a state which is as illustrated in the right region of FIG. 5C may be implemented.

In FIGS. 5A to 5C, an example embodiment is illustrated where original images included in the same stitching group are stitched in the order of the first stitching group, the second stitching group, and the third stitching group, but example embodiments are not limited thereto and original images included in the same stitching group may be stitched in a different order. For example, in another example embodiment, the image processor 120 may stitch original images included in the same stitching group in the order of the third stitching group, the first stitching group, and the second stitching group.

Figure 5D:
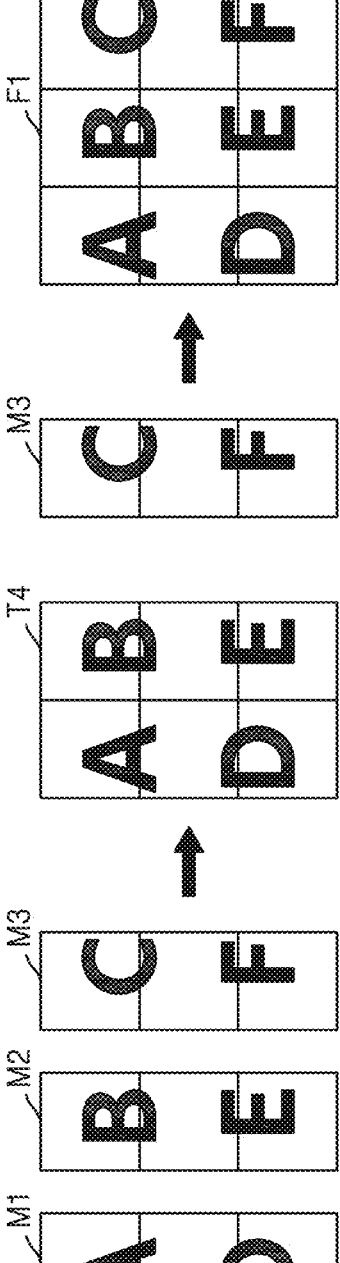

Finally, referring to FIG. 5D, an example embodiment where the image processor 120 stitches a plurality of intermediate images based on the second stitching direction may be checked.

As illustrated in the left region of FIG. 5D, when there are the first to third intermediate images M1 to M3, the image processor 120 may stitch the first intermediate image M1 and the second intermediate image M2. As illustrated in the middle region of FIG. 5D generated in this manner, the image processor 120 may stitch an image T4, where the first intermediate image M1 and the second intermediate image M2 are stitched, and the third intermediate image M3 to generate a merged image F1. Therefore, a merged image may be finally generated.

As described above, the imaging device 100 according to an example embodiment may stitch the plurality of original images based on the first and second stitching directions to generate a merged image, and thus, may stitch images arranged in various directions.

Figure 6:
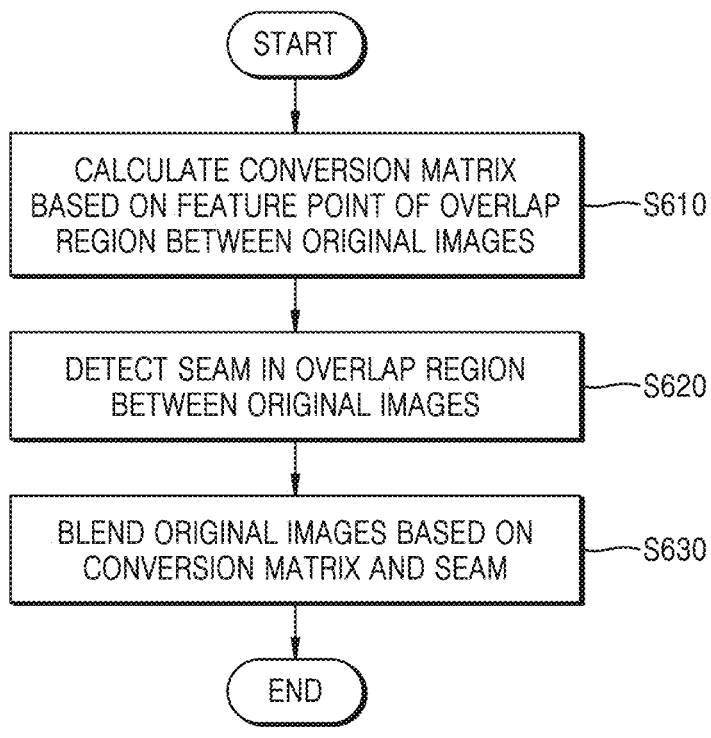
FIG. 6 is a flowchart illustrating a method of stitching a plurality of original images by using an imaging device, according to an example embodiment.

FIG. 6 is a flowchart illustrating a method of stitching a plurality of original images by using an imaging device, according to an example embodiment.

Referring to FIG. 6, in operation S610, the image processor 120 may perform a conversion matrix based on a feature point between two stitching object images.

The stitching object image may be an image which is to be stitched by the image processor 120 currently and may be an original image, an image generated by stitching an original image and an original image, an intermediate image, or an image generated by stitching an intermediate image and an intermediate image.

The conversion matrix may be a matrix representing a mapping relationship or a conversion relationship between two stitching object images, so as to offset a rotation angle difference and a magnification difference between the two stitching object images.

The image processor 120 may perform the conversion matrix based on a feature point of an overlap region between the two stitching object images. For example, when the two stitching object images are original images included in the same stitching group, the image processor 120 may perform the conversion matrix based on a feature point of an overlap region between the original images included in the same stitching group.

A more detailed method of calculating the conversion matrix by using the image processor 120 is described below with reference to FIG. 7.

In operation S620, the image processor 120 may detect a seam in the overlap region between the two stitching object images.

A seam may be a boundary of a subject in an image. In this case, the image processor 120 may detect a seam included in each of the two stitching object images, and thus, may detect the same portion in the two stitching object images.

A more detailed method of detecting a seam by using the image processor 120 is described below with reference to FIG. 8.

In operation S630, the image processor 120 may blend the two stitching object images based on the conversion matrix and the seam.

The image processor 120 may warp the two stitching object images based on the conversion matrix and may blend the warped two stitching object images to match the detected seam.

Figure 7:
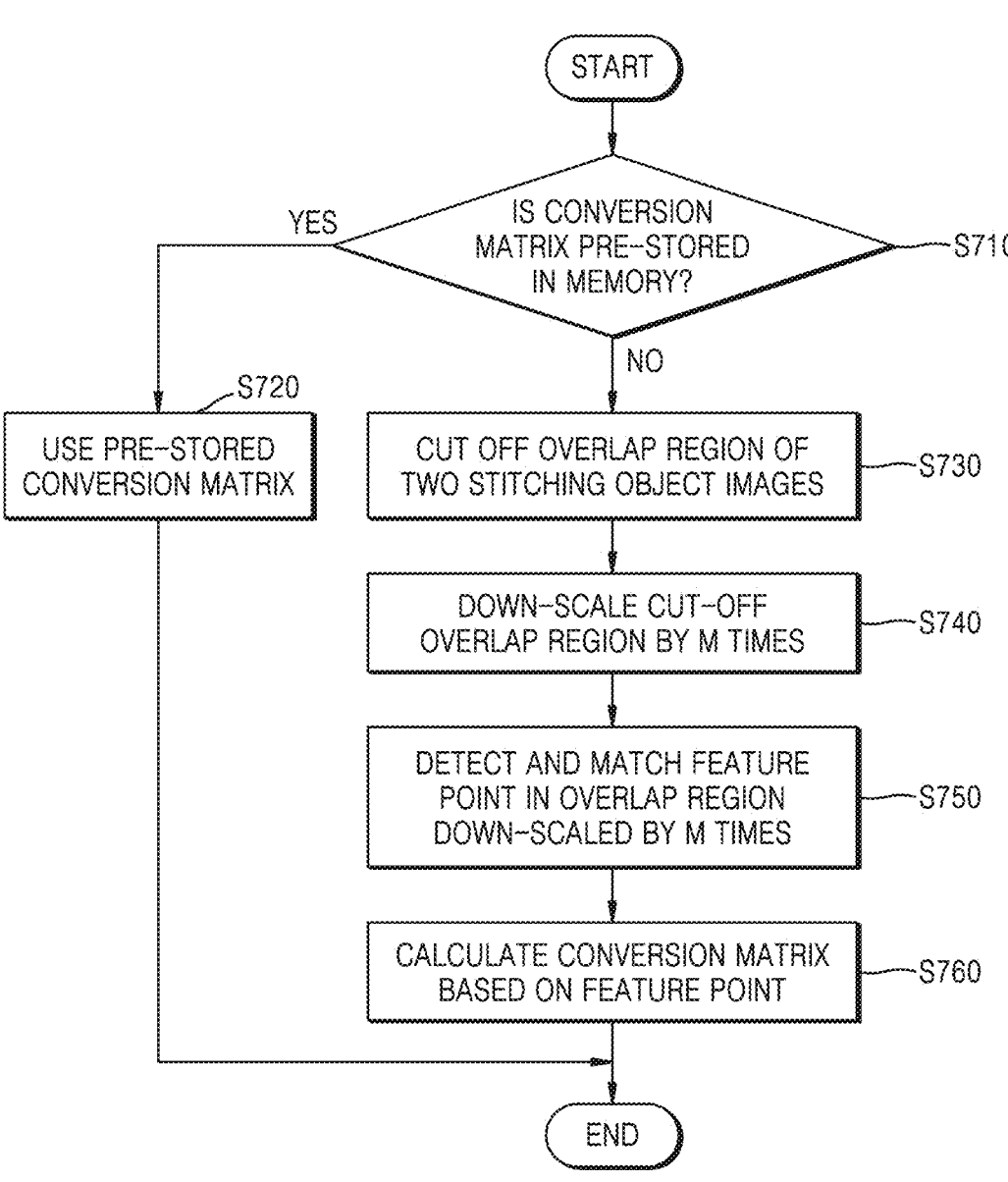
FIG. 7 is a flowchart illustrating a method of calculating a conversion matrix between a plurality of original images by using an imaging device, according to an example embodiment.

FIG. 7 is a flowchart illustrating a method of calculating a conversion matrix between a plurality of original images by using an imaging device, according to an example embodiment.

Referring to FIG. 7, in operation S710, the image processor 120 may determine whether there is a conversion matrix pre-stored in the memory 130.

In some example embodiments where a plurality of original images are generated by the image sensor 110 while rotating the optical device 140 in a desired (or alternatively, predetermined) direction and at a desired (or alternatively, predetermined) angle, the image processor 120 may identically maintain a rotation angle and a magnification between the plurality of original images. In some example embodiments, a conversion matrix between the plurality of original images may be always identically performed. Therefore, because a conversion matrix corresponding to rotation information about the optical device 140 is stored in the memory 130, a time taken in generating a merged image may be reduced.

When there is a conversion matrix pre-stored in the memory 130, the image processor 120 may use the conversion matrix pre-stored in the memory 130 instead of calculating the conversion matrix in operation S720. That is, the image processor 120 may blend original images included in the same stitching group based on the conversion matrix read from the memory 130.

When there is no conversion matrix pre-stored in the memory 130, the image processor 120 may cut off an overlap region between two stitching object images in operation S730. At this time, the image processor 120 may further cut off a region which is obtained by adding a margin region to the overlap region between the two stitching object images.

In operation S740, the image processor 120 may down-scale, by M times, the overlap region cut off from the two stitching object images. In some example embodiments, M, which is a multiple of down-scaling, may be set to a degree to which a feature point may be identically detected in two stitching object images.

In operation S750, the image processor 120 may detect a feature point in an overlap region, down-scaled by M times, of the two stitching object images and may match feature points of the two stitching object images.

A feature point may be a point at which a color difference with a peripheral region in a stitching object image is large. In an example embodiment, the image processor 120 may detect feature points in the two stitching object images, and then, may match feature points having the same color in the two stitching object images.

In operation S760, the image processor 120 may perform a conversion matrix based on the feature point of the two stitching object images. In an example embodiment, the image processor 120 may perform the conversion matrix so that a peripheral region of the feature point in the two stitching object images is identically converted.

As described above, the imaging device 100 according to an example embodiment may calculate a conversion matrix in an overlap region, and thus, may generate a merged image through a small number of arithmetic operations in a short processing time.

Figure 8:
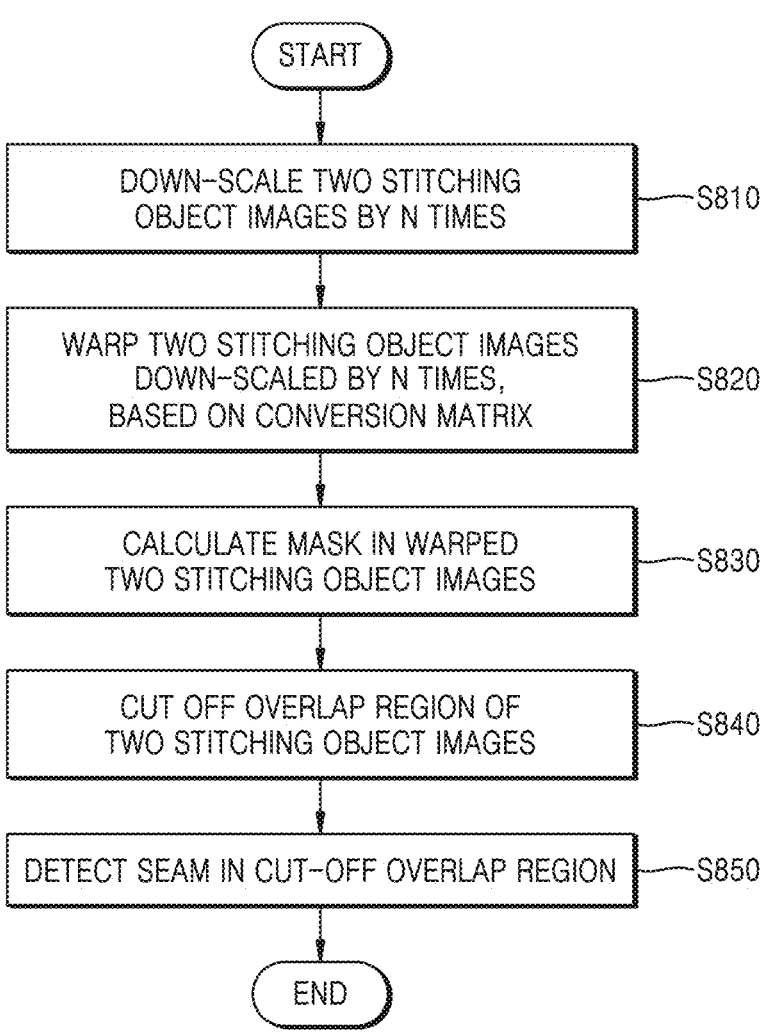
FIG. 8 is a flowchart illustrating a method of detecting a seam between a plurality of original images by using an imaging device, according to an example embodiment.

FIG. 8 is a flowchart illustrating a method of detecting a seam between a plurality of original images by using an imaging device, according to an example embodiment.

Referring to FIG. 8, in operation S810, the image processor 120 may down-scale two stitching object images by N times. In some example embodiments, N, which is a multiple of down-scaling, may be set to a degree to which a mask may be identically or substantially identically calculated in two stitching object images.

In operation S820, the image processor 120 may warp two stitching object images down-scaled by N times, based on the conversion matrix. The image processor 120 may select one of the two stitching object images as a warping object image, multiply the warping object image by the conversion matrix, and intactly maintain a stitching object image instead of the warping object image, thereby warping the two stitching object images.

In operation S830, the image processor 120 may calculate a mask in the warped two stitching object images. In an example embodiment, the image processor 120 may calculate a mask so that a foreground and a background are differentiated from each other in the two stitching object images. In some example embodiments, in the two stitching object images, the foreground may be displayed in black, and the background may be displayed in white.

In operation S840, the image processor 120 may cut off an overlap region of the two stitching object images. At this time, the image processor 120 may further cut off a region which is obtained by adding a margin region to the overlap region between the two stitching object images.

In operation S850, the image processor 120 may detect a seam in the cut-off overlap region. In an example embodiment, the image processor 120 may detect, as a seam, a boundary of the mask in the overlap region between the two stitching object images.

As described above, the imaging device 100 according to an example embodiment may detect a seam in an overlap region, and thus, may generate a merged image through a small number of arithmetic operations in a short processing time.

Figure 9:
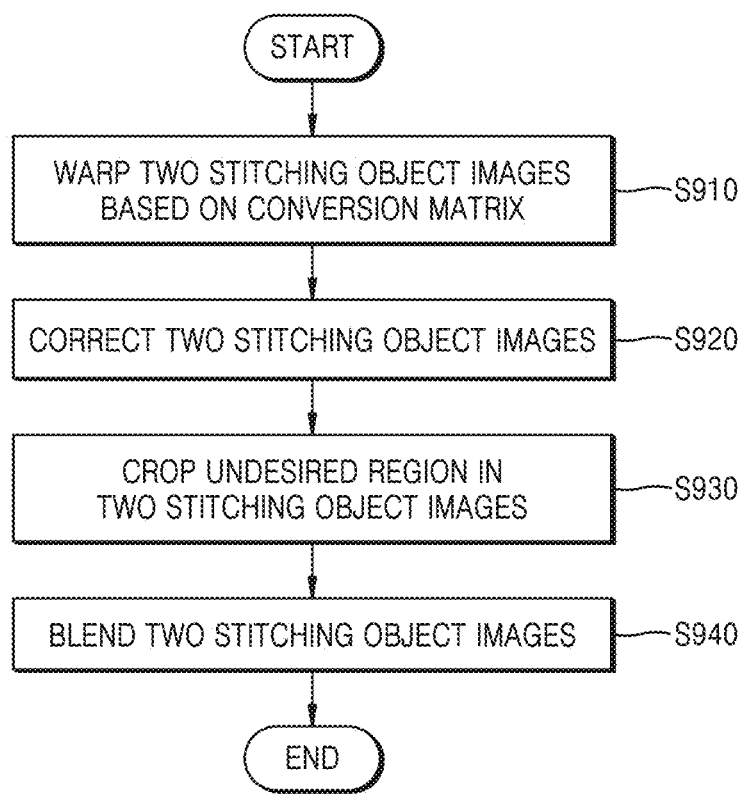
FIG. 9 is a flowchart illustrating a method of blending a plurality of original images by using an imaging device, according to an example embodiment.

FIG. 9 is a flowchart illustrating a method of blending a plurality of original images by using an imaging device, according to an example embodiment.

Referring to FIG. 9, in operation S910, the image processor 120 may warp two stitching object images based on a conversion matrix. The image processor 120 may select one of the two stitching object images as a warping object image, multiply the warping object image by the conversion matrix, and intactly maintain a stitching object image instead of the warping object image, thereby warping the two stitching object images.

In operation S920, the image processor 120 may perform correction of the two stitching object images. The image processor 120 may correct a sense of color, a tone, and light exposure with respect to a region where a seam of the warped two stitching object images is provided, and thus, an image may be more natural after the two stitching object images are stitched.

In operation S930, the image processor 120 may crop an unnecessary region in the two stitching object images. In an example embodiment, the image processor 120 may crop a region, where an image is not generated in the two stitching object images, or a region, which is not included in a merged image.

In some example embodiments, when optimization of a memory is desired or needed, the image processor 120 may crop the unnecessary region in the two stitching object images, and then, may blend the two stitching object images. As described above, blending may be performed through cropping instead of an unnecessary region, and thus, the number of arithmetic operations and the number of uses of a memory may be reduced.

In operation S940, the image processor 120 may blend the two stitching object images. The image processor 120 may blend the two stitching object images, based on a detected feature point and a seam, and thus, may complete stitching of the two stitching object images.

As described above, the imaging device 100 according to an example embodiment may stitch a plurality of original images, based on a conversion matrix calculated in an overlap region and a seam detected in the overlap region, and thus, a merged image may be generated through a small number of arithmetic operations in a short processing time.

Figure 10:
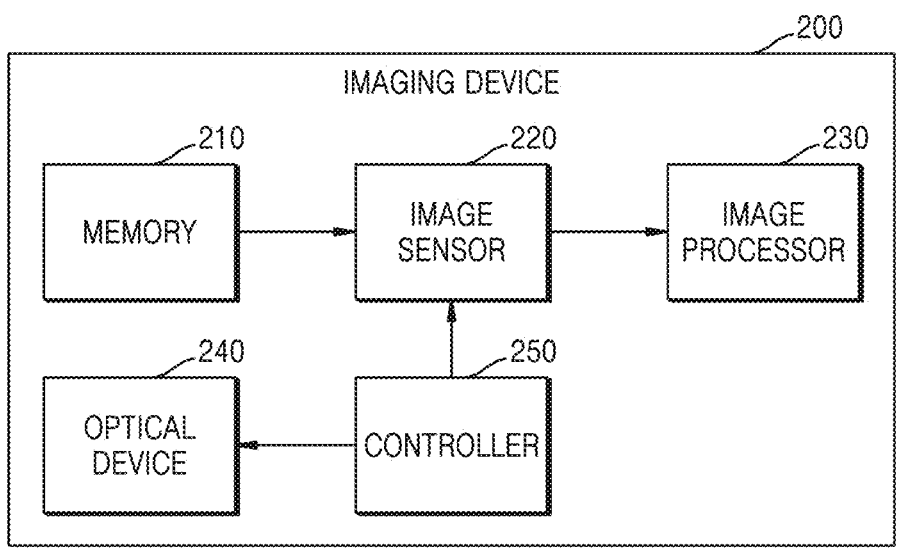
FIG. 10 is a block diagram illustrating an imaging device according to another example embodiment.

FIG. 10 is a block diagram illustrating an imaging device 200 according to another example embodiment.

Referring to FIG. 10, the imaging device 200 according to another example embodiment may include a memory 210, an image sensor 220, an image processor 230, an optical device 240, and a controller 250.

In some example embodiments, the memory 210 of FIG. 10 may perform an operation similar to that of the memory 130 of FIG. 1, the image sensor 220 of FIG. 10 may perform an operation similar to that of the image sensor 110 of FIG. 1, the image processor 230 of FIG. 10 may perform an operation similar to that of the image processor 120 of FIG. 1, and the optical device 240 of FIG. 10 may perform an operation similar to that of the optical device 140 of FIG. 1. Hereinafter, a difference with the elements of FIG. 1 is mainly described.

The memory 210 may store a conversion matrix used in warping of an original image, a cropping region representing an unnecessary region in the original image, and an overlap region representing a region where the original image overlaps another original image.

In some example embodiments where the imaging device 200 generates a merged image based on a plurality of original images, a conversion matrix may be a matrix representing a mapping relationship or a conversion relationship between the plurality of original images, so as to offset a rotation angle difference and a magnification difference between the plurality of original images. The conversion matrix may be previously calculated based on a feature point of an overlap region between the plurality of original images, and then, may be stored in the memory 210.

The cropping region may represent a region, which is not used to generate a merged image in a case where the imaging device 200 generates the merged image based on a plurality of original images. The cropping region may be previously calculated based on a relationship between the plurality of original images, and then, may be stored in the memory 210.

The overlap region may represent a region overlapping a region included in another original image among regions included in one original image. The overlap region may be a region, which is used to calculate a feature point, a mapping relationship, and a conversion relationship, in a case where the imaging device 200 generates the merged image based on the plurality of original images. The overlap region may be previously calculated based on a relationship between the plurality of original images, and then, may be stored in the memory 210.

In some example embodiments where the merged image is generated based on the plurality of original images arranged in both directions including a first direction and a second direction, the cropping region may be set so that the original image is cropped in one of the first and second directions. In an example embodiment, the first direction may be a column direction, and the second direction may be a row direction. However, this is merely an example embodiment, and the inventive concepts are not limited thereto. That is, the first direction may be the row direction, and the second direction may be the column direction.

The image sensor 220 may generate an original image, warp the original image by using the conversion matrix to generate a warping image, and crop the warping image by using the cropping region to generate a cropping image. Herein, an example embodiment where the image sensor 220 generates the warping image and the cropping image is mainly described, but this is for convenience of description and the inventive concepts are not limited thereto. That is, the image processor 230 may generate the warping image and the cropping image from the original image received from the image sensor 220, and in such an example embodiment, the memory 210 may provide the image processor 230 with information (for example, the conversion matrix, the cropping region, etc.) desired or needed for generating the warping image and the cropping image. Furthermore, the image sensor 220 and the image processor 230 may be integrated into one circuit or chip.

In more detail, the image sensor 220 may photograph a target object to generate an original image. In some example embodiments, the image sensor 220 may receive a photograph signal from the controller 250, and thus, may photograph the target object to generate the original image.

The image sensor 220 may receive the conversion matrix from the memory 210. In this case, the image sensor 220 may receive the conversion matrix, corresponding to rotation information included in a rotation signal transmitted to the optical device 240 by the controller 250, from the memory 210 before receiving the photograph signal from the controller 250. Also, the image sensor 220 may multiply the original image by the conversion matrix, and thus, may warp the original image to generate a warping image.

Subsequently, the image sensor 220 may receive the cropping region from the memory 210. In some example embodiments, the image sensor 220 may receive the cropping region, corresponding to the rotation information included in the rotation signal transmitted to the optical device 240 by the controller 250, from the memory 210 before receiving the photograph signal from the controller 250. The cropping region may be calculated to include a region, which is not used to generate the merged image in the warping image, and may be stored in the memory 210. The image sensor 220 may crop the cropping region in the warping image to generate a cropping image. In some example embodiments, the image sensor 220 may crop pixels corresponding to the cropping region in the warping image to generate the cropping image.

Also, the image sensor 220 may receive the overlap region from the memory 210. In some example embodiments, the image sensor 220 may receive the overlap region, corresponding to the rotation information included in the rotation signal transmitted to the optical device 240 by the controller 250, from the memory 210 before receiving the photograph signal from the controller 250. The overlap region may include coordinates of an overlap region between the plurality of original images, and in a case where a relationship between the plurality of original images has to be calculated, the image sensor 220 may use the overlap region.

Also, the image processor 230 may calculate a conversion matrix in the overlap region and a seam included in the original image. In some example embodiments, the image processor 230 may directly receive the overlap region from the memory 210, or may receive the overlap region from the image sensor 220. For example, the image sensor 220 may add information about the overlap region to a header or a footer of the original image and may transfer the original image to the image processor 230. As another example, the image sensor 220 may store the overlap region, received from the memory 210, in a storage region such as an internal register, and the image processor 230 may read the overlap region stored in the image sensor 220. However, a method of receiving the overlap region by using the image processor 230 is not limited thereto. In an example embodiment, when the image sensor 220 generates one original image, the image sensor 220 may generate the cropping image based on the original image and may transmit the cropping image to the image processor 230. That is, whenever the image sensor generates one original image, the image sensor 220 may perform warping and cropping to immediately generate the cropping image and may transmit the generated cropping image to the image processor 230.

The image processor 230 may receive a plurality of cropping images from the image sensor 220 and may blend the plurality of cropping images to generate a merged image.

In some example embodiments, the image processor 230 may blend the plurality of cropping images to generate the merged image, so that seams detected in the plurality of cropping images match.

In an example embodiment, the image processor 230 may generate the merged image based on N (where N is a natural number of 2 or more) number of cropping images received from the image sensor 220. That is, when desired (or alternatively, predetermined) N cropping images are received from the image sensor 220, the image processor 230 may blend the received N cropping images to generate the merged image.

The optical device 240 may rotate based on rotation information including a direction and an angle to adjust a field of view of each of the plurality of original images. The rotation information about the optical device 240 may be previously set, and the optical device 240 may identically rotate based on the same rotation information. In some example embodiments, as the optical device 240 rotates based on the same rotation information, a rotation angle and a magnification between the plurality of original images generated by the image sensor 220 may be identically or substantially identically maintained.

In an example embodiment, the conversion matrix and the cropping region stored in the memory 210 may be calculated based on the rotation information. A field of view of the original image generated by the image sensor 220 may be adjusted based on a rotation of the optical device 240 based on the rotation information. As described above, because an original image is generated to have a different field of view based on rotation information, the image sensor 220 has to differently warp and crop the original image, based on the rotation information. Accordingly, the conversion matrix and the cropping region may be calculated based on rotation information.

The controller 250 may transmit the rotation signal to the optical device 240 and may transmit a photograph signal, corresponding to the rotation signal, to the image sensor 220.

The rotation signal may be a signal for controlling a rotation of the optical device 240. In an example embodiment, the controller 250 may transmit the rotation signal including the rotation information to the optical device 240, and the optical device 240 may rotate in response to the rotation signal received from the controller 250.

The photograph signal may be a signal for controlling photographing by the image sensor 220. In some example embodiments, as a rotation of the optical device 240 based on the rotation signal is completed, the photograph signal may be transmitted to the image sensor 220. In an example embodiment, the controller 250 may transmit the photograph signal to the image sensor 220, and in response to the photograph signal received from the controller 250, the image sensor 220 may photograph a target object to generate an original image.

As described above, the imaging device 200 according to an example embodiment may store the conversion matrix, calculated based on the rotation information about the optical device 240, in the memory 210, and thus, the image sensor 220 may warp the original image by using the conversion matrix to generate the warping image without performing a complicated operation and may crop the warping image by using the cropping region to generate the cropping image.

Also, the imaging device 200 according to an example embodiment may perform warping and cropping by using the image sensor 220 and may perform blending by using the image processor 230 to generate the merged image, thereby generating the merged image in a short processing time.

FIGS. 11A to 11D are diagrams illustrating a process of generating a merged image from a plurality of original images by using an imaging device, according to another example embodiment.

Figure 11A:
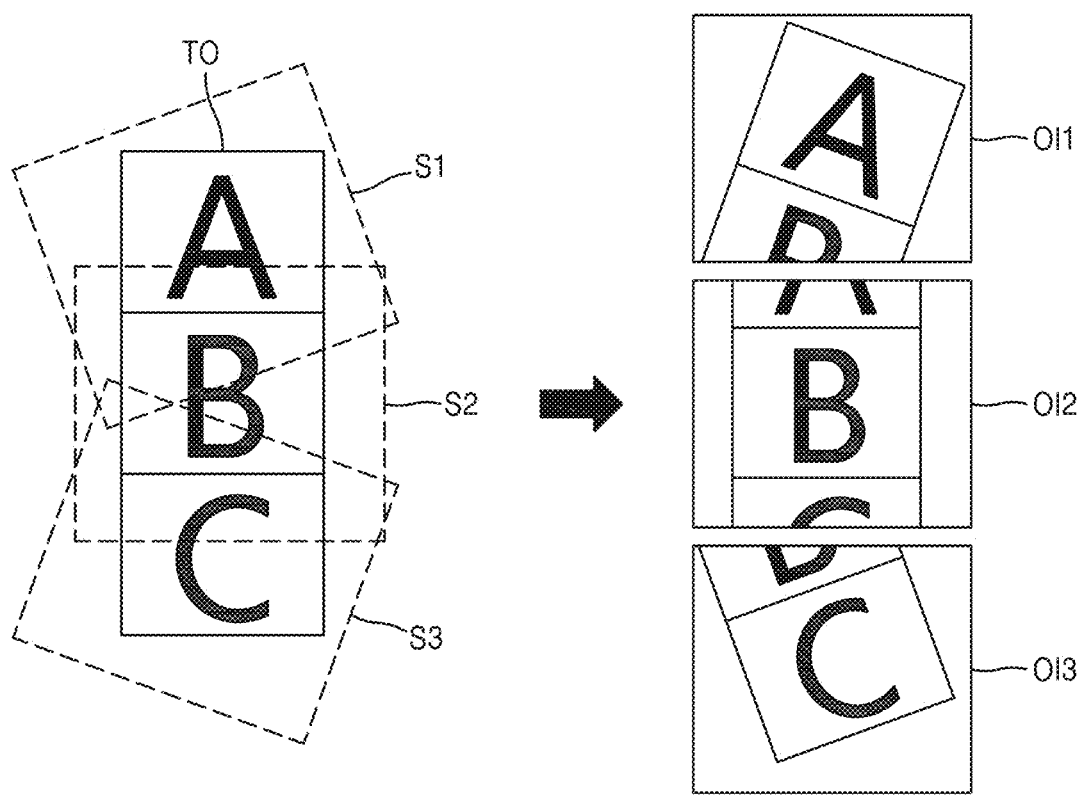
FIGS. 11A, 11B, 11C and 11D are diagrams illustrating a process of generating a merged image from a plurality of original images by using an imaging device, according to another example embodiment.

Referring to FIG. 11A, a plurality of original images (for example, first to third original images) OI1 to OI3 generated by photographing a target object TO through the image sensor 220 may be checked.

The image sensor 220 may photograph the target object TO with different fields of view, based on a rotation of the optical device 240. In the example embodiment of FIG. 11A, the image sensor 220 may photograph the target object TO with a first field of view S1, a second field of view S2, and a third field of view S3, based on a rotation of the optical device 240. The image sensor 220 may obtain the first original image OI1, the second original image OI2, and the third original image OI3 as a result of photographing the target object TO, based on the first field of view S1, the second field of view S2, and the third field of view S3.

Figure 11B:
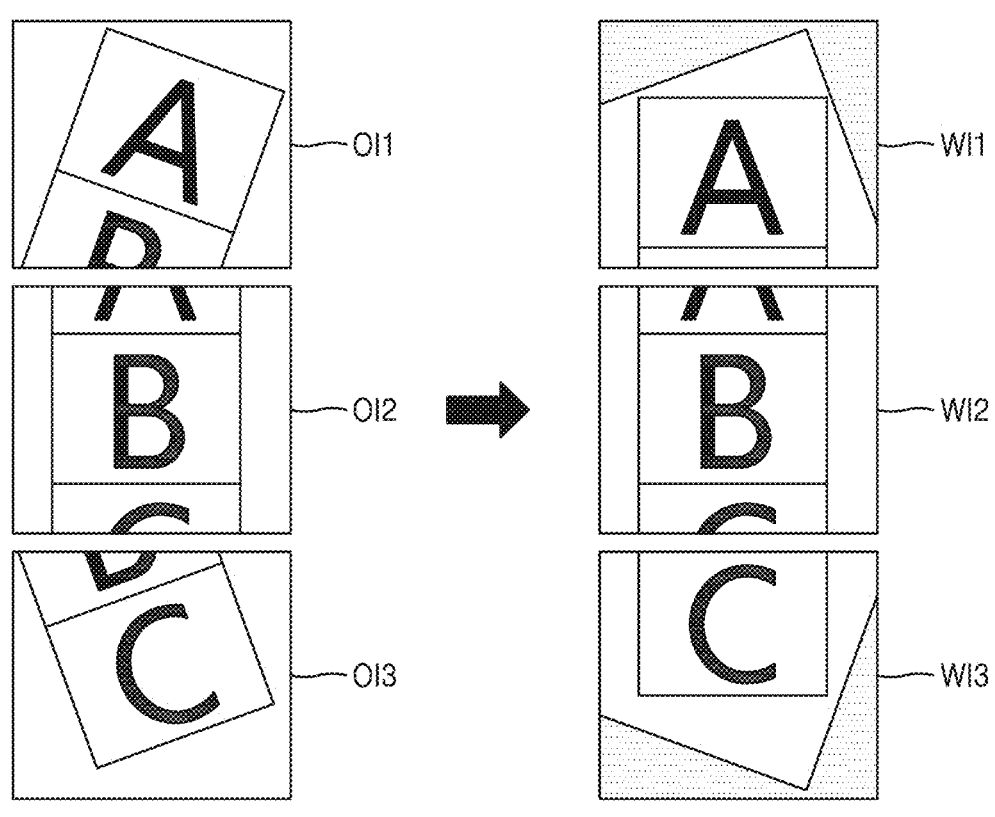

Referring to FIG. 11B, a plurality of warping images WI1 to WI3 generated by warping the plurality of original images OI1 to OI3 through the image sensor 220 may be checked.

The image sensor 220 may receive a plurality of conversion matrixes respectively corresponding to the plurality of original images OI1 to OI3 from the memory 210 and may warp the plurality of original images OI1 to OI3 by using the plurality of conversion matrixes to generate the plurality of warping images (for example, first to third warping images) WI1 to WI3.

In the example embodiment of FIG. 11B, a conversion matrix used for warping of the first original image OI1 may rotate the first original image OI1 counterclockwise. Also, a conversion matrix used for warping of the second original image OI2 may not rotate the second original image OI2. Finally, a conversion matrix used for warping of the third original image OI3 may rotate the third original image OI3 clockwise.

In this case, the plurality of warping images WI1 to WI3 generated by warping the plurality of original images OI1 to OI3 may include a region including no information as colored in white in FIG. 11B. The region may be a region which is not needed for generating a merged image and may be removed through cropping.

In some example embodiments, when one original image is generated, the image sensor 220 may generate a warping image based on the original image. For example, when the image sensor 220 generates the first original image OI1, the image sensor 220 may warp the first original image OI1 to generate the first warping image WI1, regardless of generating of the second original image OI2. Also, when the image sensor 220 generates the second original image OI2, the image sensor 220 may warp the second original image OI2 to generate the second warping image WI2, regardless of generating the third original image OI3.

Figure 11C:
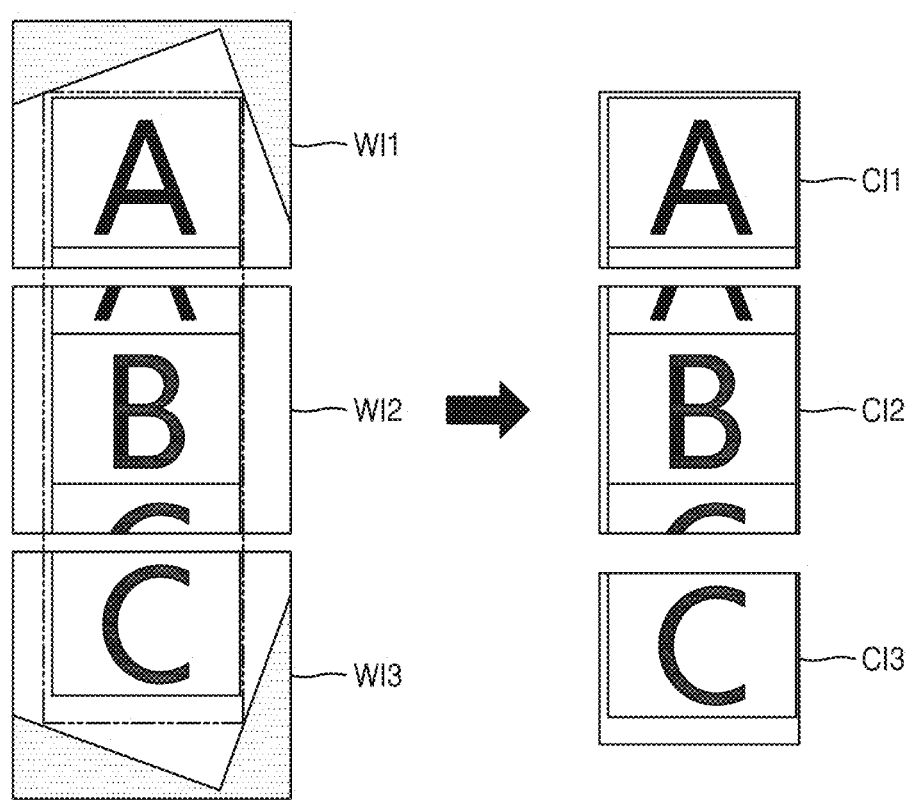

Referring to FIG. 11C, a plurality of cropping images CI1 to CI3 generated by cropping the plurality of warping images WI1 to WI3 through the image sensor 220 may be checked.

The image sensor 220 may receive a plurality of cropping regions respectively corresponding to the plurality of warping images WI1 to WI3 from the memory 210 and may crop the plurality of warping images WI1 to WI3 by using the plurality of cropping regions to generate the plurality of cropping images (for example, first to third cropping images) CI1 to CI3.

In the example embodiment of FIG. 11C, a cropping region may be an outer region of a region surrounded by a dash-double dotted line among regions of the plurality of warping images WI1 to WI3. Therefore, the image sensor 220 may crop the plurality of warping images WI1 to WI3 along a dash-double dotted line and may generate inner regions of the dash-double dotted line as the plurality of cropping images CI1 to CI3.

In some example embodiments, when one warping image is generated, the image sensor 220 may generate a cropping image based on the warping image. For example, when the image sensor 220 generates the first warping image WI1, the image sensor 220 may crop the first warping image WI1 to generate the first cropping image CI1, regardless of generating the second warping image WI2. Also, when the image sensor 220 generates the second warping image WI2, the image sensor 220 may crop the second warping image WI2 to generate the second cropping image CI2, regardless of generating the third warping image WI3.

Figure 11D:
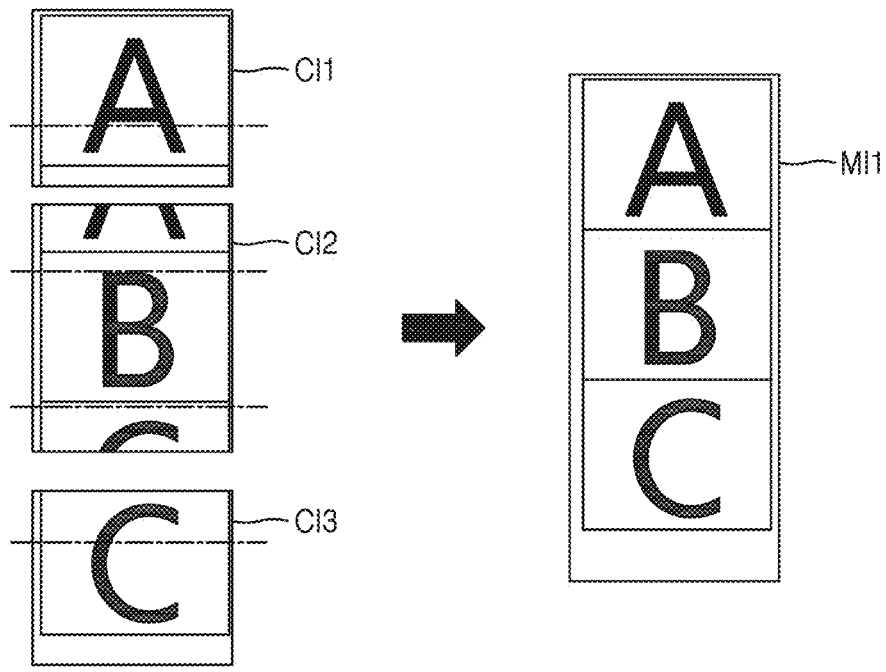

Referring to FIG. 11D, a merged image MI1 generated by blending the plurality of cropping images CI1 to CI3 through the image processor 230 may be checked.

The image processor 230 may receive the plurality of cropping images CI1 to CI3 from the image sensor 220 and may blend the plurality of cropping images CI1 to CI3 to generate the merged image MI1, so that seams detected in the plurality of cropping images CI1 to CI3 match.

In the example embodiment of FIG. 11D, the image processor 230 may blend the plurality of cropping images CI1 to CI3 to generate the merged image MI1, so that lines displayed as dash-single dotted lines in the plurality of cropping images CI1 to CI3 overlap. For example, the image processor 230 may blend the first cropping image CI1 and the second cropping image CI2 so that a dash-single dotted line displayed in the first cropping image CI1 overlaps an upper line of dash-single dotted lines displayed in the second cropping image CI2. Also, the image processor 230 may blend the second cropping image CI2 and the third cropping image CI3 so that a dash-single dotted line displayed in the third cropping image CI3 overlaps a lower line of the dash-single dotted lines displayed in the second cropping image CI2.

At this time, when the image processor 230 receives N number of cropping images from the image sensor 220, the image processor 230 may blend the received N cropping images to generate the merged image MI1. As in the example embodiment of FIG. 11D, in a case where N is 3, when the image processor 230 receives three cropping images from the image sensor 220, the image processor 230 may blend the received three cropping images to generate a merged image.

Figure 12:
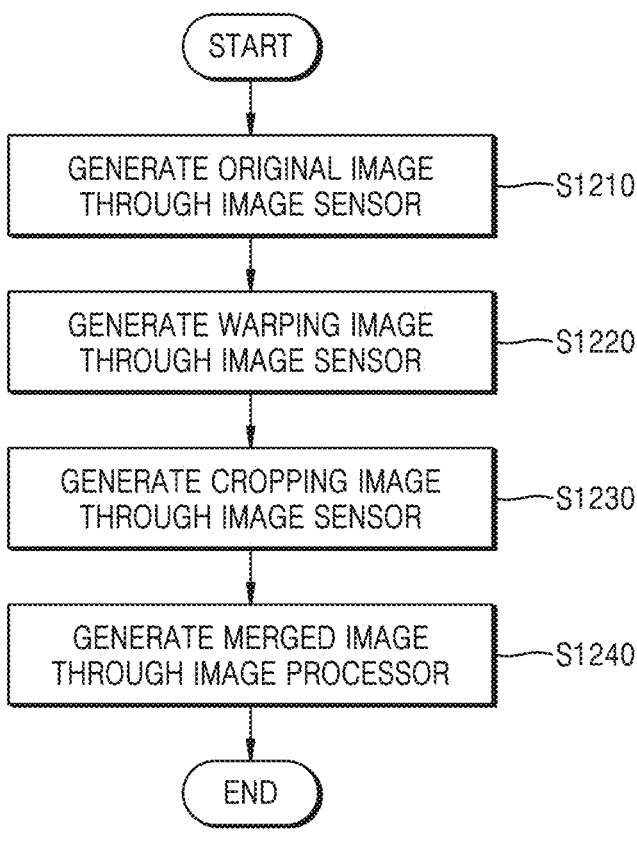
FIG. 12 is a flowchart illustrating a process of generating a merged image from a plurality of original images by using an imaging device, according to another example embodiment.

FIG. 12 is a flowchart illustrating a process of generating a merged image from a plurality of original images by using an imaging device, according to another example embodiment.

Referring to FIG. 12, in operation S1210, the imaging device 200 may photograph a target object through the image sensor 220 to generate an original image. The image sensor 220 may receive a photograph signal from the controller 250, and thus, may photograph the target object to generate the original image.

In operation S1220, the imaging device 200 may generate a warping image by using the image sensor 220. The image sensor 220 may warp the original image by using a conversion matrix received from the memory 210 to generate a warping image.

In operation S1230, the imaging device 200 may generate a cropping image by using the image sensor 220. The image sensor 220 may crop the warping image by using a cropping region received from the memory 210 to generate a cropping image.

In operation S1240, the imaging device 200 may generate a merged image by using the image sensor 220. The image processor 230 may blend N number of cropping images received from the image sensor 220 to generate the merged image.

As described above, the imaging device 200 according to an example embodiment may perform warping and cropping by using the image sensor 220 and may perform blending by using the image processor 230 to generate the merged image, thereby generating the merged image in a short processing time.

Figure 13:
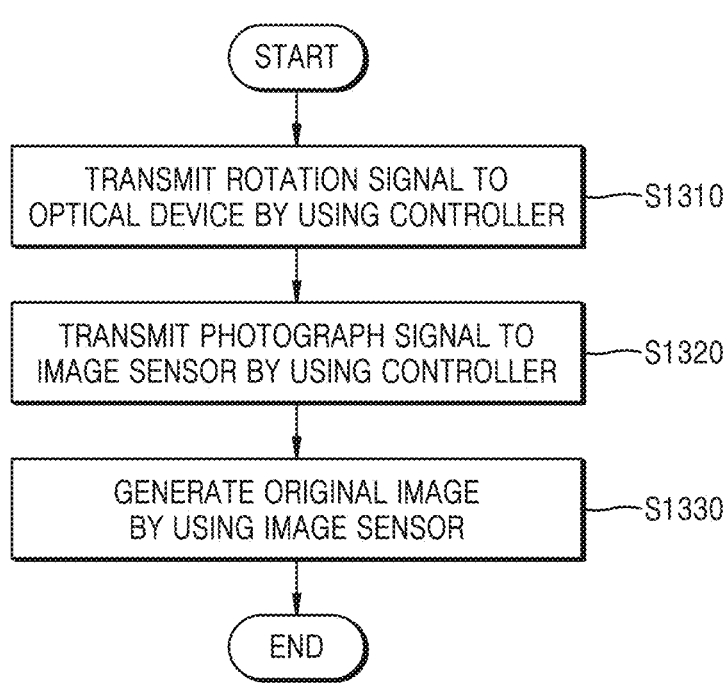
FIG. 13 is a flowchart illustrating a process of generating an original image by using an imaging device, according to another example embodiment.

FIG. 13 is a flowchart illustrating a process of generating an original image by using an imaging device, according to another example embodiment.

Referring to FIG. 13, in operation 51310, the controller 250 may transmit and receive a rotation signal to and from the optical device 240. When the rotation signal is received from the controller 250, the optical device 240 may rotate based on rotation information included in the rotation signal. Accordingly, a field of view of the image sensor 220 photographing a target object may be adjusted.

In operation S1320, the controller 250 may transmit a photograph signal to the image sensor 220. When a rotation of the optical device 240 is completed, the controller 250 may transmit the photograph signal to the image sensor 220. In an example embodiment, when a rotation completion signal is received from the optical device 240, the controller 250 may transmit the photograph signal to the image sensor 220. In another example embodiment, when a maximum time taken in rotating of the optical device 240 elapses after the controller 250 transmits the rotation signal to the optical device 240, the controller 250 may transmit the photograph signal to the image sensor 220.

In operation S1330, the image sensor 220 may photograph a target object to generate an original image. In response to the photograph signal received from the controller 250, the image sensor 220 may photograph the target object to generate the original image. The image sensor 220 may start to capture an image in synchronization with the received photograph signal to photograph one frame or a plurality of frames, thereby generating the original image. Also, the image sensor may photograph another frame or a plurality of frames in synchronization with a photograph signal additionally input thereto. That is, the image sensor 220 may generate one image or a plurality of images synchronized with each photograph signal input from the outside. In this case, operation S1330 may correspond to operation S1210 of FIG. 12.

Figure 14:
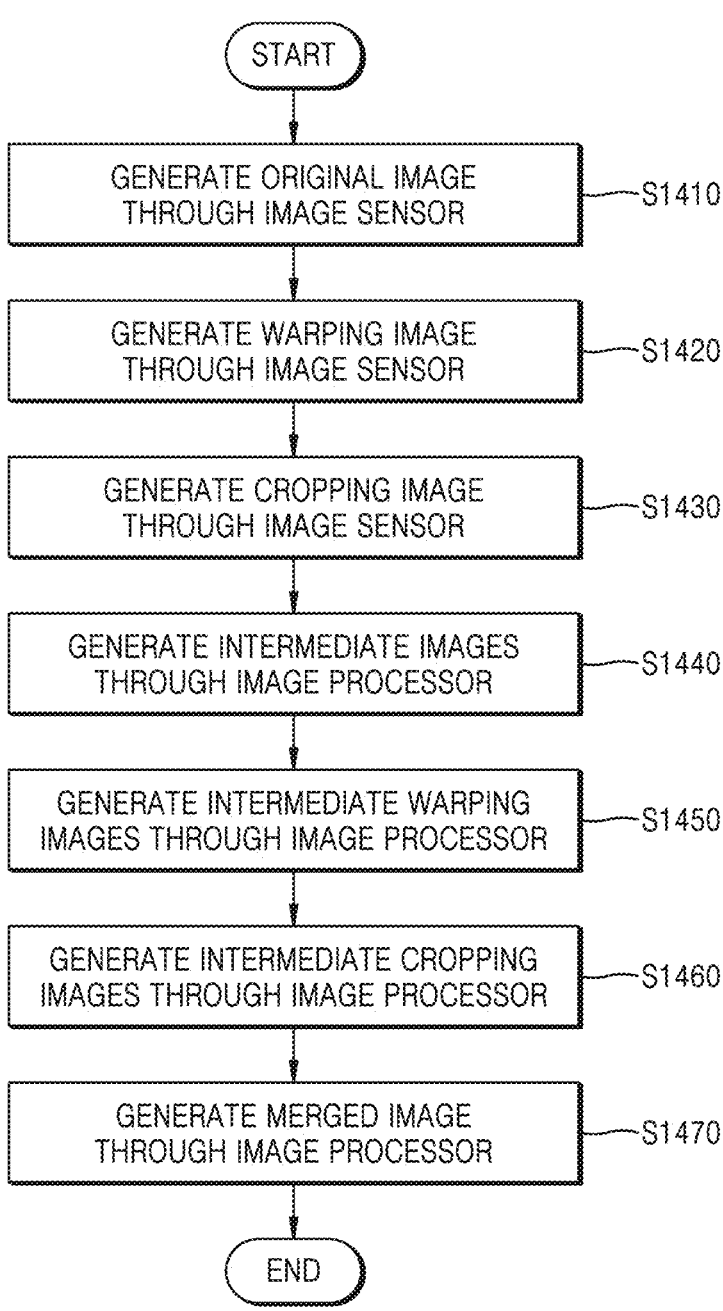
FIG. 14 is a flowchart illustrating a process of generating a merged image from a plurality of original images arranged in both directions by using an imaging device, according to another example embodiment.

FIG. 14 is a flowchart illustrating a process of generating a merged image from a plurality of original images arranged in both directions by using an imaging device according to another example embodiment.

Referring to FIG. 14, in operation S1410, the imaging device 200 may capture an original image by using the image sensor 220. The image sensor 220 may receive a photograph signal from the controller 250, and thus, may capture the original image. Operation S1410 may correspond to operation S1210 of FIG. 12.

In operation S1420, the imaging device 200 may generate a warping image by using the image sensor 220. The image sensor 220 may warp the original image by using a conversion matrix received from the memory 210 to generate a warping image. Operation S1420 may be the same as operation S1220 of FIG. 12.

In operation S1430, the imaging device 200 may generate a cropping image by using the image sensor 220. The image sensor 220 may crop the warping image by using a cropping region received from the memory 210 to generate a cropping image.

In some example embodiments where a merged image is generated from a plurality of original images arranged in both directions, a cropping region may be set so that a warping image is cropped in one direction selected from among first and second directions. For example, as in the example embodiment illustrated in FIGS. 5A to 5D, in a case where original images are arranged in both directions, the image processor 230 may generate a plurality of intermediate images through stitching based on the first stitching direction and may generate a merged image through stitching based on the second stitching direction. In some example embodiments, the plurality of intermediate images may have different angles and different magnifications. Therefore, in some example embodiments where stitching is performed based on the second stitching direction, the image processor 230 has to warp and crop the plurality of intermediate images to implement matching of a rotation angle and a magnification. In this state, in a case where the image sensor 220 crops original images based on a cropping region set to be cropped in both directions in cropping the original images, an image may be doubly cropped in the same direction, and thus, a region included in a merged image may be reduced. Accordingly, in a case where a merged image is generated from a plurality of original images arranged in both directions, a cropping region may be set so that a warping image is cropped in one direction selected from among first and second directions, and thus, a merged image where an excessive number of regions are deleted compared to an original image may be prevented from being generated.

In operation S1440, the imaging device 200 may generate the plurality of intermediate images by using the image processor 230. The image processor 230 may blend N number of cropping images received from the image sensor 220 to generate an intermediate image. In this case, the N cropping images may be arranged in the same direction. For example, when each of the N cropping images is a cropping image which is set to be cropped in the first direction in operation S1430, each of the N cropping images may be an image which is generated based on N number of original images arranged in the first direction.

In operation S1450, the imaging device 200 may generate a plurality of intermediate warping images by using the image processor 230. The image sensor 220 may warp the plurality of intermediate images by using a conversion matrix received from the memory 210 to generate the plurality of intermediate warping images.

In some example embodiments, warping of the original image in operation S1420 may be performed by the image sensor 220, but warping of the intermediate image in operation S1450 may be performed by the image processor 230. As described above, an operation after the intermediate image is generated may be performed by the image processor 230, and thus, a time needed for image processing may be reduced.

In operation S1460, the imaging device 200 may generate a plurality of intermediate cropping images by using the image processor 230. The image sensor 220 may crop the plurality of intermediate warping images by using a cropping region received from the memory 210 to generate the plurality of intermediate cropping images.

In some example embodiments, cropping of the warping image in operation S1430 may be performed by the image sensor 220, but cropping of the intermediate warping image in operation S1460 may be performed by the image processor 230. As described above, an operation after the intermediate image is generated may be performed by the image processor 230, and thus, a time needed for image processing may be reduced.

In operation S1470, the imaging device 200 may generate a merged image by using the image processor 230. The image processor 230 may blend the plurality of intermediate cropping images to generate the merged image.

Figure 15:
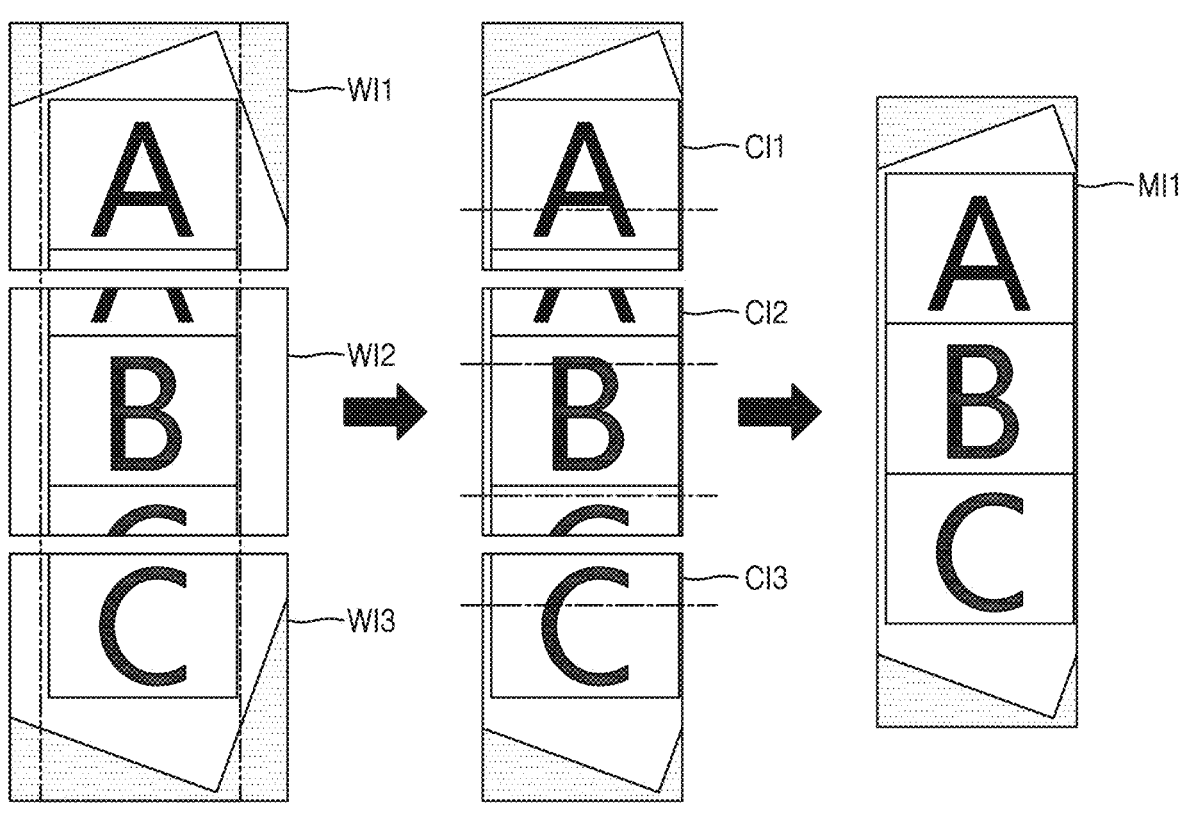
FIG. 15 is a diagram illustrating a process of performing cropping in only one direction to generate a cropping image by using an imaging device, according to another example embodiment.

FIG. 15 is a diagram illustrating a process of performing cropping in only one direction to generate a cropping image by using an imaging device according to another example embodiment.

Referring to FIG. 15, a plurality of cropping images CI1 to CI3 and an intermediate image M1 generated by cropping a plurality of warping images WI1 to WI3 in only one direction by using the imaging device 200 may be checked. This may be an operation corresponding to operation S1430 and operation S1440 of FIG. 14.

As described above with reference to FIG. 14, in a case where a merged image is generated from a plurality of original images arranged in both directions, a cropping region may be set so that a warping image is cropped in one direction selected from among first and second directions.

In the example embodiment of FIG. 15, a cropping region may be set so that a warping image is cropped in only a column direction, and thus, may be an outer region of a region surrounded by a dash-double dotted line among regions of the plurality of warping images WI1 to WI3. Therefore, the image sensor 220 may crop the plurality of warping images WI1 to WI3 along a dash-double dotted line and may generate inner regions of the dash-double dotted line as the plurality of cropping images CI1 to CI3.

Subsequently, the image processor 230 may receive the plurality of cropping images CI1 to CI3 from the image sensor 220 and may blend the plurality of cropping images CI1 to CI3 to generate an intermediate image M1, so that seams detected in the plurality of cropping images CI1 to CI3 match.

In the example embodiment of FIG. 15, the image processor 230 may blend the plurality of cropping images CI1 to CI3 to generate the intermediate image M1, so that lines displayed as dash-single dotted lines in the plurality of cropping images CI1 to CI3 overlap.

Accordingly, in some example embodiments where a merged image is generated from a plurality of original images arranged in both directions, a cropping region may be set so that a warping image is cropped in one direction selected from among first and second directions, and thus, a merged image where an excessive number of regions are deleted compared to an original image may be prevented from being generated.

Figure 16:
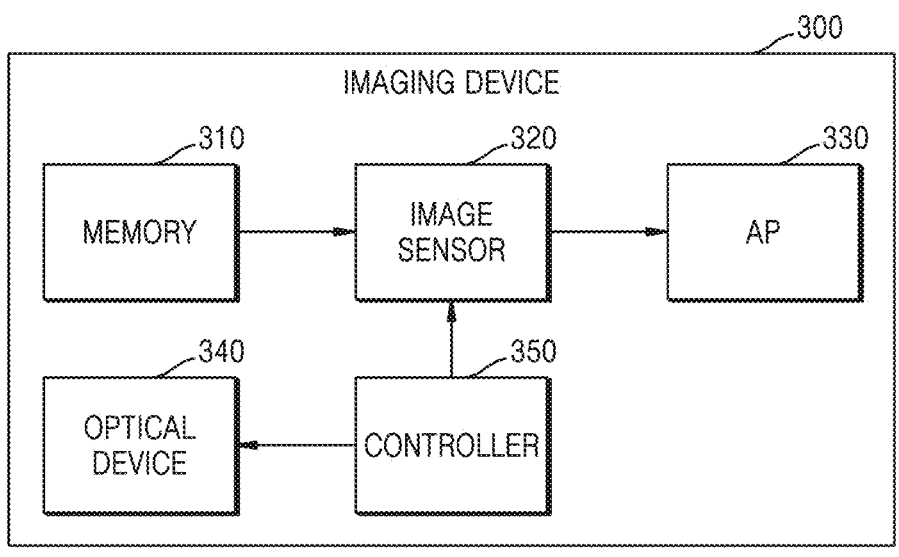
FIG. 16 is a block diagram illustrating an imaging device according to another example embodiment.

FIG. 16 is a block diagram illustrating an imaging device 300 according to another example embodiment.

Referring to FIG. 16, the imaging device 300 according to another example embodiment may include a memory 310, an image sensor 320, an application processor (AP) 330, an optical device 340, and a controller 350.

In this case, the memory 310, the image sensor 320, the optical device 340, and the controller 350 may be the same or substantially the same as the memory 210, the image sensor 220, the optical device 240, and the controller 250 of FIG. 10.

The AP 330 may be a central processing unit (CPU), a microprocessor, or a micro controller unit (MCU), but is not limited thereto.

The AP 330 may include an image processor. In this case, the AP 330 of the imaging device 300 may be a processor which executes software performing image processing, and the image processor may be software or may be implemented by a combination of hardware and software.

Figure 17A:
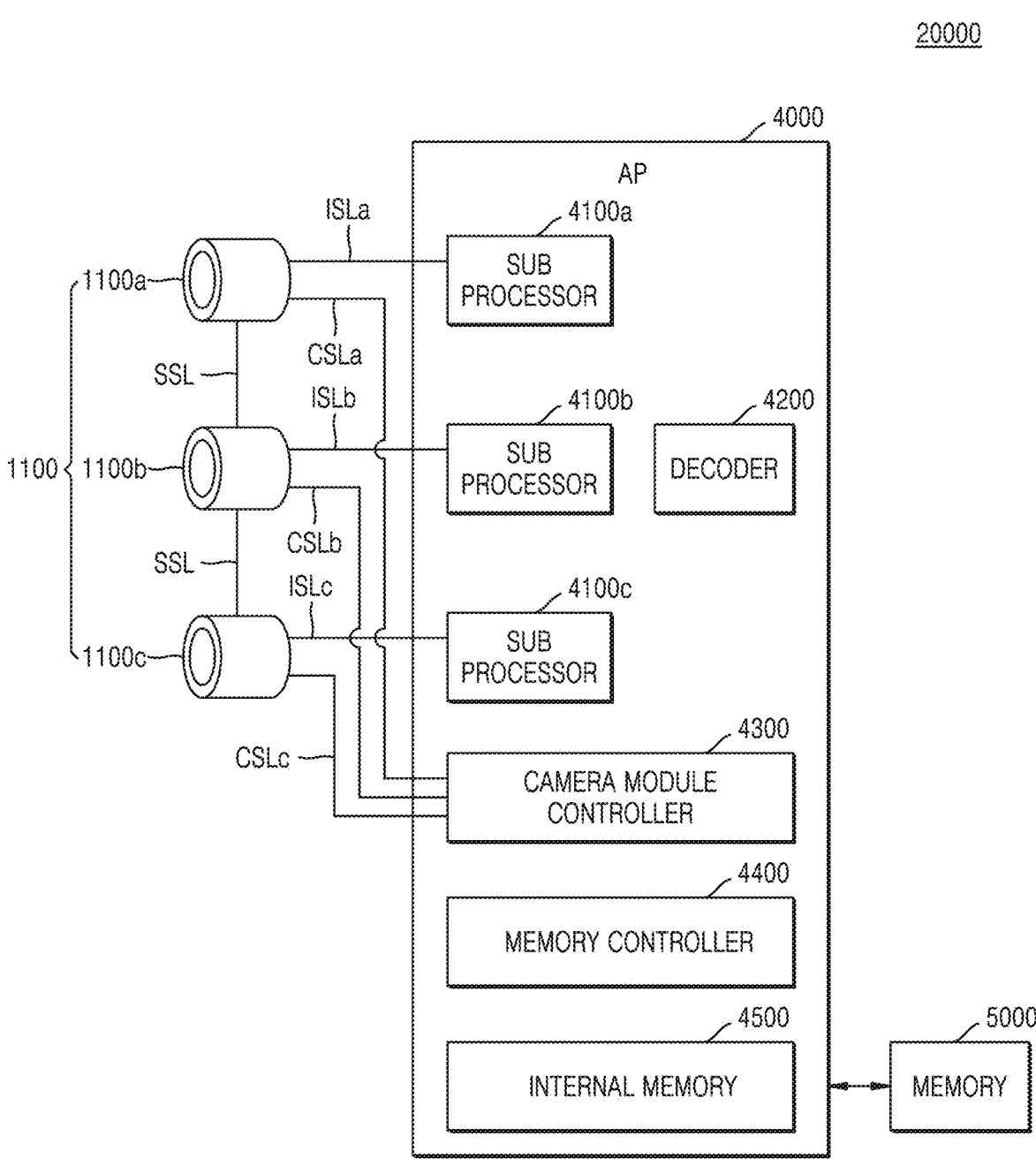
FIGS. 17A and 17B are block diagrams illustrating an electronic device including a plurality of imaging devices, according to an example embodiment.
Figure 17B:
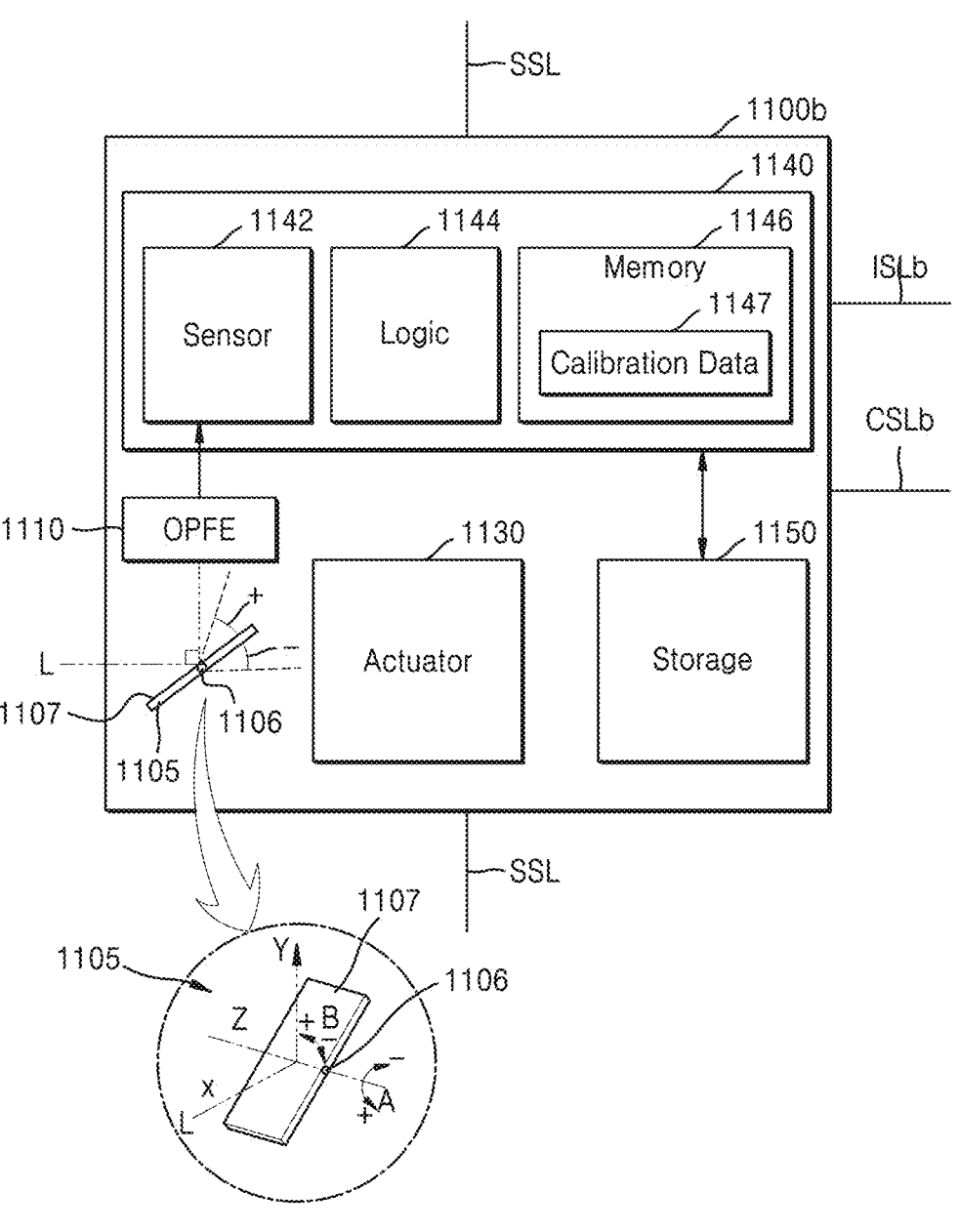

FIGS. 17A and 17B are block diagrams illustrating an electronic device 20000 including a plurality of imaging devices, according to an example embodiment.

Referring to FIG. 17A, the electronic device 20000 may include a multi imaging device 1100, an AP 4000, and a memory 5000. The memory 5000 may perform the same function as that of the memory 130 illustrated in FIG. 1, and thus, a repetitive description thereof is omitted. At least one of imaging devices 1100a, 1100b, and 1100c of FIG. 17A may perform a function similar to that of the imaging device 100 of FIG. 1.

The electronic device 20000 may capture and/or store an image of a subject by using a complementary metal oxide semiconductor (CMOS) image sensor and may be implemented as a mobile phone, a tablet computer, or a portable electronic device. The portable electronic device may include a laptop computer, a mobile phone, a smartphone, a tablet PC, and a wearable device. The electronic device 20000 may include one or more imaging devices and an AP which processes image data generated by the one or more imaging device.

The multi imaging device 1100 may include a first imaging device 1100a, a second imaging device 1100b, and a third imaging device 1100c. For convenience of description, three imaging devices 1100a to 1100c are illustrated, but example embodiments are not limited thereto and a various number of imaging devices may be included in the multi imaging device 1100.

Imaging devices included in the multi imaging device 1100 may stitch a plurality of original images based on first and second stitching directions to generate a merged image. Also, the imaging devices included in the multi imaging device 1100 may stitch the plurality of original images, based on a conversion matrix calculated in an overlap region and a seam detected in the overlap region. Accordingly, images arranged in various directions may be stitched, and thus, a merged image may be generated through a small number of arithmetic operations in a short processing time.

Also, the imaging devices included in the multi imaging device 1100 may store a conversion matrix, calculated based on rotation information about an optical device, in a memory. Also, the imaging devices included in the multi imaging device 1100 may perform warping and cropping by using an image sensor and may perform blending by using an image processor to generate a merged image. Accordingly, the image sensor may warp an original image by using a conversion matrix to generate a warping image, without performing a complicated operation, and may crop the warping image by using a cropping region to generate a cropping image, thereby generating a merged image in a short processing time.

Hereinafter, a detailed configuration of the imaging device 1100b will be described in more detail with reference to FIG. 17B, but the following description may be identically applied to the other imaging devices 1100a and 1100c according to an example embodiment.

Referring to FIG. 17B, the second imaging device 1100b may include a prism 1105, an optical path folding element (OPFE) 1110, an actuator 1130, an image sensing device 1140, and a storage 1150.

The prism 1105 may include a reflection surface of a light reflecting material and may change a path of light L incident from the outside.

According to an example embodiment, the prism 1105 may change the path of the light L, which is incident in a first direction X, to a second direction Y vertical to the first direction X. Also, the prism 1105 may rotate the reflection surface 1107 of the light reflecting material in an A direction with respect to a center shaft 1106 or may rotate the reflection surface 1107 of the light reflecting material in a B direction with respect to the center shaft 1106 to change the path of the light L, which is incident in the first direction X, to the second direction Y. At this time, the OPFE 1110 may move in a third direction Z vertical to the first direction X and the second direction Y.

In an example embodiment, as illustrated, a maximum rotation angle of the prism 1105 in the A direction may be 21 degrees or less in a positive (+) A direction and may be greater than 21 degrees in a negative (−) A direction, but example embodiments are not limited thereto.

In an example embodiment, the prism 1105 may move by about 20 degrees in a positive (+) B direction or a negative (−) B direction, or may move by 15 degrees to 20 degrees. Here, in a moving angle, the prism 1105 may move at the same angle in the positive (+) B direction or the negative (−) B direction, or may move at an almost similar angle within a range of about 1 degree, but example embodiments are not limited thereto.

In an embodiment, the prism 1105 may move the reflection surface 1107 of the light reflecting material in a third direction (for example, a Z direction) parallel to an extension direction of the center shaft 1106.

The OPFE 1110 may include, for example, an optical lens divided into m (where m is a natural number) number of groups. Also, m number of lenses may move in the first direction X to change an optical zoom ratio of the imaging device 1100b. For example, in a case where a basic optical zoom ratio of the imaging device 1100b is Z, when the m optical lenses included in the OPFE 1110 move, an optical zoom ratio of the imaging device 1100b may be changed to an optical zoom ratio of 3Z or 5Z or more.

The actuator 1130 may move the OPFE 1110 or an optical lens (hereinafter referred to as an optical lens) to a certain position. For example, the actuator 1130 may adjust a position of the optical lens so that the image sensor 1141 is disposed at a focal length of the optical lens, for accurate sensing.

The image sensing device 1140 may include an image sensor 1142, a control logic 1144, and a memory 1146. The image sensor 1142 may sense an image of a sensing target by using the light L provided through the optical lens. The image sensor 1142 of FIG. 17B may be functionally similar to the image sensor 110 of FIG. 1 or the image sensor 220 of FIG. 10, and thus, a repetitive description thereof is omitted. The control logic 1144 may control an overall operation of the second imaging device 1100b. For example, the control logic 1144 may control an operation of the second imaging device 1100b, based on a control signal provided through a control signal line CSLb.

The memory 1146 may store information, needed for an operation of the second imaging device 1100b, such as calibration data 1147. The calibration data 1147 may include information desired or needed for the second imaging device 1100*b* to generate image data by using the light L provided from the outside. The calibration data 1147 may include, for example, information about the degree of rotation, information about a focal length, information about an optical axis, and calibration information needed for image processing, described above. In a case where the second imaging device 1100*b* is implemented in the form of multi-state camera where a focal length varies based on a position of an optical lens, the calibration data 1147 may include information associated with auto focusing and a focal length value based on each position (or each state) of the optical lens.

The storage 1150 may store image data sensed through the image sensor 1142. The storage 1150 may be disposed outside the image sensing device 1140 and may be implemented as a stacked type with a sensor chip configuring the image sensing device 1140. In an example embodiment, the storage 1150 may be implemented with electrically erasable programmable read-only memory (EEPROM), but example embodiments are not limited thereto.

In an example embodiment, each of the plurality of imaging devices 1100*a*, 1100*b*, and 1100*c* may include the actuator 1130. Therefore, each of the plurality of imaging devices 1100*a*, 1100*b*, and 1100*c* may include the same or different calibration data 1147 based on an operation of the actuator 1130 included therein.

In an example embodiment, one imaging device (for example, the second imaging device 1100*b*) of the plurality of imaging devices 1100*a*, 1100*b*, and 1100*c* may be an imaging device having a folded lens form including the prism 1105 and the OPFE 1110 described above, and the other imaging devices (for example, 1100*a* and 1100*b*) may each be an imaging device having a vertical form including no prism 1105 and OPFE, 1110, but example embodiments are not limited thereto.

In an example embodiment, one imaging device (for example, the third imaging device 1100*c*) of the plurality of imaging devices 1100*a*, 1100*b*, and 1100*c* may be, for example, a depth camera having a vertical form, which extracts depth information by using infrared ray (IR). In this case, the AP 4000 may merge image data, provided from the depth camera, with image data provided from the other imaging device (for example, the first imaging device 1100*a* or the second imaging device 1100*b*) to generate a three-dimensional (3D) depth image.

In an example embodiment, at least two imaging devices (for example, the first imaging device 1100*a* or the second imaging device 1100*b*) of the plurality of imaging devices 1100*a*, 1100*b*, and 1100*c* may have different fields of view (angles of view). In this case, for example, optical lenses of at least two imaging devices (for example, the first imaging device 1100*a* or the second imaging device 1100*b*) of the plurality of imaging devices 1100*a*, 1100*b*, and 1100*c* may differ, but example embodiments are not limited thereto. For example, the first imaging device 1100*a* of the plurality of imaging devices 1100*a*, 1100*b*, and 1100*c* may be less in field of view than the second and third imaging devices 1100*b* and 1100*c*. However, example embodiments are not limited thereto, and the multi imaging device 1100 may further include an imaging device which is greater in field of view than the imaging devices 1100*a*, 1100*b*, and 1100*c* which are fundamentally used.

Also, in some example embodiments, angles of view of the plurality of imaging devices 1100*a*, 1100*b*, and 1100*c* may differ. In this case, optical lensed respectively included in the plurality of imaging devices 1100*a*, 1100*b*, and 1100*c* may differ, but example embodiments are not limited thereto.

In some example embodiments, the plurality of imaging devices 1100*a*, 1100*b*, and 1100*c* may be physically arranged apart from one another. That is, instead of that a sensing region of one image sensor 1142 is divided and used by the plurality of imaging devices 1100*a*, 1100*b*, and 1100*c*, an independent image sensor 1142 may be disposed in each of the plurality of imaging devices 1100*a*, 1100*b*, and 1100*c*.

The AP 4000 may include a plurality of sub-processors 4100*a*, 4100*b*, and 4100*c*, a decoder 4200, an imaging device controller 4300, a memory controller 4400, and an internal memory 4500.

The AP 4000 may be implemented apart from the plurality of imaging devices 1100*a*, 1100*b*, and 1100*c*. For example, the AP 4000 and the plurality of imaging devices 1100*a*, 1100*b*, and 1100*c* may be separated from one another and each implemented as a separate semiconductor chip.

Pieces of image data generated by the plurality of imaging devices 1100*a*, 1100*b*, and 1100*c* may be provided to corresponding sub-processors 4100*a*, 4100*b*, and 4100*c* through image signal lines (for example, first to third image signal lines) ISLa, ISLb, and ISLc which are apart from one another. For example, image data generated by the first imaging device 1100*a* may be provided to the first sub-processor 4100*a* through the first image signal line ISLa, image data generated by the second imaging device 1100*b* may be provided to the second sub-processor 4100*b* through the second image signal line ISLb, and image data generated by the third imaging device 1100*c* may be provided to the third sub-processor 4100*c* through the third image signal line ISLc. Such image data transmission, for example, may be performed by using a camera serial interface (CSI) based on a mobile industry processor interface (MIPI), but example embodiments are not limited thereto.

In an example embodiment, one sub-processor may be disposed to correspond to a plurality of imaging devices. For example, the first sub-processor 4100*a* and the third sub-processor 4100*c* may not be implemented apart from each other as illustrated but may be integrated and implemented as one sub-processor, and image data provided from the imaging device 1100*a* and the imaging device 1100*c* may be selected by a selection element (for example, a multiplexer), and then, may be provided to an integrated sub image processor.

The imaging device controller 4300 may provide a control signal to each of the imaging devices 1100*a*, 1100*b*, and 1100*c*. The control signal generated by the imaging device controller 4300 may be provided to corresponding imaging devices 1100*a*, 1100*b*, and 1100*c* through control signal lines CSLa, CSLb, and CSLc which are apart from one another.

Based on a mode signal or an image generating information including a zoom signal, one of the plurality of imaging devices 1100*a*, 1100*b*, and 1100*c* may be designated as a master camera (for example, 1100*b*), and the other imaging devices (for example, 1100*a* and 1100*c*) may be designated as a slave camera. Such information may be added to the control signal and may be provided to corresponding imaging devices 1100*a*, 1100*b*, and 1100*c* through the control signal lines CSLa, CSLb, and CSLc which are apart from one another.

The imaging devices 1100*a*, 1100*b*, and 1100*c* operating as a master and a slave may be changed based on control by the imaging device controller 4300. For example, a field of view of the first imaging device 1100*a* may be greater than that of the second imaging device 1100*b*, and when a zoom factor represents a low zoom ratio, the second imaging device 1100*b* may operate as a master and the first imaging device 1100a may operate as a slave. On the other hand, when the zoom factor represents a high zoom ratio, the first imaging device 1100a may operate as a master and the second imaging device 1100b may operate as a slave.

In an example embodiment, the control signal provided from the imaging device controller 4300 to each of the imaging devices 1100a, 1100b, and 1100c may include a sync enable signal. For example, when the second imaging device 1100b is a master camera and each of the first and third imaging devices 1100a and 1100c is a slave camera, the imaging device controller 4300 may transfer the sync enable signal to the second imaging device 1100b. The second imaging device 1100b provided with the sync enable signal may generate a sync signal based on the provided sync enable signal and may provide the generated sync signal to the first and third imaging devices 1100a and 1100c through a sync signal line SSL. The first imaging device 1100a and the second and third imaging devices 1100b and 1100c may provide image data to the AP 4000 in synchronization with the sync signal.

Hereinabove, example embodiments have been described in the drawings and the specification. Example embodiments have been described by using the terms described herein, but this has been merely used for describing the example embodiments and has not been used for limiting a meaning or limiting the scope of the inventive concepts. Therefore, it may be understood by those of ordinary skill in the art that various modifications and other example embodiments may be implemented from the inventive concepts.

One or more of the elements disclosed above may include or be implemented in one or more processing circuitries such as hardware including logic circuits; a hardware/software combination such as a processor executing software; or a combination thereof. For example, the processing circuitries more specifically may include, but is not limited to, a central processing unit (CPU), an arithmetic logic unit (ALU), a digital signal processor, a microcomputer, a field programmable gate array (FGPA), a System-on-Chip (SoC), a programmable logic unit, a microprocessor, application-specific integrated circuit (ASIC), etc.

While the inventive concepts have been particularly shown and described with reference to example embodiments thereof, it will be understood that various changes in form and details may be made therein without departing from the scope of the example embodiments.

What is claimed is:

1. An imaging device comprising:
an image sensor configured to generate a plurality of original images of a target object; and
an image processor configured to generate a merged image based on the plurality of original images,
wherein the image processor is configured to
classify the plurality of original images into a plurality of stitching groups based on a first stitching direction,
generate a plurality of intermediate images by stitching original images from the plurality of original images included in a same stitching group from among the plurality of stitching groups,
generate the merged image by stitching the plurality of intermediate images based on a second stitching direction, and
stitch the original images included in the same stitching group by blending the original images included in the same stitching group based on a conversion matrix calculated in an overlap region between the original images included in the same stitching group and a seam detected in the overlap region.

2. The imaging device of claim 1, wherein one of the first stitching direction and the second stitching direction is a row direction, and another of the first stitching direction and the second stitching direction is a column direction.

3. The imaging device of claim 2, further comprising an optical device configured to rotate based on rotation information, the rotation information including a direction and an angle to adjust fields of view of the plurality of original images,
wherein the image processor is configured to determine the first stitching direction and the second stitching direction based on the rotation information.

4. The imaging device of claim 1, wherein the image processor is configured to calculate the conversion matrix based on a feature point of the overlap region between the original images included in the same stitching group.

5. The imaging device of claim 1, further comprising a memory configured to store the conversion matrix,
wherein the image processor is configured to blend the original images included in the same stitching group based on the conversion matrix read from the memory.

6. The imaging device of claim 1, wherein the image processor is configured to correct the original images included in the same stitching group.

7. The imaging device of claim 1, wherein the image processor is configured to crop a region in the original images included in the same stitching group.

8. The imaging device of claim 7, further comprising a memory configured to store image processing data,
wherein the image processor is configured to optimize the memory by cropping the region in the original images included in the same stitching group, and blending the original images included in the same stitching group.

9. The imaging device of claim 1, wherein the image processor is configured to stitch the plurality of intermediate images by blending the plurality of intermediate images based on the conversion matrix.

10. An imaging device for generating a merged image based on a plurality of original images, the imaging device comprising:
a memory configured to store conversion matrixes for warping the plurality of original images, and a plurality of cropping regions of the plurality of original images;
an image sensor configured to generate the plurality of original images of a target object, warp the plurality of original images by using the conversion matrixes to generate a plurality of warping images, and crop the plurality of warping images by using the plurality of cropping regions to generate a plurality of cropping images;
an image processor configured to receive the plurality of cropping images from the image sensor, and blend the plurality of cropping images to generate the merged image; and
an optical device configured to collect light from the target object and rotate to adjust fields of view of the plurality of original images generated by the image sensor based on rotation information, the rotation information including a direction and an angle,
wherein the conversion matrixes and the plurality of cropping regions are calculated based on the rotation information, and
the image processor is configured to generate the merged image based on a conversion matrix from among the conversion matrixes calculated in an overlap region between original images from among the plurality of original images, and a seam detected in the overlap region.

11. The imaging device of claim 10, further comprising a controller configured to transmit a rotation signal to the optical device, and transmit a photograph signal, corresponding to the rotation signal, to the image sensor.

12. The imaging device of claim 11, wherein the image sensor is configured to photograph the target object to generate the plurality of original images, in response to the photograph signal.

13. The imaging device of claim 10, wherein the plurality of cropping regions are calculated to include regions which are not used in the plurality of warping images to generate the merged image.

14. The imaging device of claim 13, wherein the image sensor is configured to crop the plurality of cropping regions in the plurality of warping images to generate the plurality of cropping images.

15. The imaging device of claim 10, wherein the image processor is configured to generate the merged image based on the plurality of cropping images received from the image sensor including N cropping images, where N is a natural number greater than or equal to 2.

16. The imaging device of claim 10, wherein the merged image is generated based on the plurality of original images arranged in a first direction and a second direction, and the plurality of cropping regions are set with the plurality of warping images cropped in one direction selected from among the first direction and the second direction.

28

17. An imaging device comprising:

a memory configured to store conversion matrixes for warping original images, and cropping regions of the original images;

an image sensor configured to, in response to a photograph signal, photograph a target object to generate the original images, warp the original images by using the conversion matrixes to generate warping images, and crop the warping images by using the cropping regions to generate cropping images;

an optical device configured to collect light from the target object and rotate to adjust fields of view of the original images generated by the image sensor based on rotation information, the rotation information including a direction and an angle;

a controller configured to transmit a rotation signal to the optical device, and generate the photograph signal corresponding to the rotation signal; and an application processor configured to receive the cropping images from the image sensor, stitch the cropping images in a first stitching direction and a second stitching direction based on the rotation information and a conversion matrix from among the conversion matrixes, and blend the cropping images to generate a merged image, wherein the application processor is configured to generate the merged image based on the conversion matrix calculated in an overlap region between the original images included in a same stitching group, and a seam in the overlap region, and wherein one of the first stitching direction and the second stitching direction is a row direction, and another one of the first stitching direction and the second stitching direction is a column direction.

* * * * *